(12) United States Patent
Nakamura

(10) Patent No.: US 8,432,657 B2
(45) Date of Patent: *Apr. 30, 2013

(54) PROTECTION APPARATUS OF LOAD CIRCUIT

(75) Inventor: Yoshihide Nakamura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 12/933,989

(22) PCT Filed: Feb. 24, 2009

(86) PCT No.: PCT/JP2009/000797
§ 371 (c)(1),
(2), (4) Date: Sep. 22, 2010

(87) PCT Pub. No.: WO2009/119001
PCT Pub. Date: Oct. 1, 2009

(65) Prior Publication Data
US 2011/0019324 A1    Jan. 27, 2011

(30) Foreign Application Priority Data
Mar. 28, 2008    (JP) ................ P2008-087668

(51) Int. Cl.
*H02H 5/04* (2006.01)
*H02H 3/20* (2006.01)
*H02H 9/04* (2006.01)
*H02H 9/08* (2006.01)

(52) U.S. Cl.
USPC .......... 361/93.8; 361/93.1; 361/93.9; 361/94; 361/101; 361/103; 361/104

(58) Field of Classification Search ................ 361/93.8, 361/93.1, 93.9, 94, 101, 103, 104
See application file for complete search history.

(56) References Cited

U.S. PATENT DOCUMENTS
5,600,575 A    2/1997 Anticole
2002/0008951 A1    1/2002 Ohta et al.
(Continued)

FOREIGN PATENT DOCUMENTS
DE    10 2006 033 044 A1    1/2008
EP    1 850 438 A2    10/2007
(Continued)

OTHER PUBLICATIONS

Official Action issued on Nov. 7, 2012, from the Chinese Patent Office in the counterpart Chinese Application.

(Continued)

*Primary Examiner* — Jared Fureman
*Assistant Examiner* — Lucy Thomas
(74) *Attorney, Agent, or Firm* — Finnegan, Henderson, Farabow, Garrett & Dunner, L.L.P.

(57) ABSTRACT

A protection apparatus of a load circuit sets a threshold temperature at a lower temperature than an allowed temperature of an electric wire for use in the load circuit, and estimates a temperature of the electric wire based on an ambient temperature, a load current and a time while the load current is flowing through the electric wire. Then, in the case where the estimated temperature has reached the threshold temperature, a semiconductor relay (S1) is broken. As a result, in the case where such an electric wire temperature has risen owing to an occurrence of an overcurrent, and the like, the circuit is surely protected at the point of time before the electric wire temperature reaches the allowed temperature. Therefore, a fuse used in a conventional load circuit becomes unnecessary.

7 Claims, 16 Drawing Sheets

U.S. PATENT DOCUMENTS

2003/0202304 A1 10/2003 Canova et al.
2007/0253132 A1 11/2007 Nakamura et al.

FOREIGN PATENT DOCUMENTS

| | | |
|---|---|---|
| JP | 7-222345 | 8/1995 |
| JP | 8 242533 | 9/1996 |
| JP | 10-285784 | 10/1998 |
| JP | 2002-84654 | 3/2002 |
| JP | 2003-100196 | 4/2003 |
| JP | 2007-295776 | 11/2007 |

OTHER PUBLICATIONS

Office Action mailed Jun. 21, 2012, in co-pending U.S. Appl. No. 12/937,993, (8 pages).

PCT International Search Report for PCT/JP2009/057598, mailed Jul. 7, 2009 (2 pages).

FIG. 12
(a)
PATTERN 1 (40[A]ON ⇒ SATURATED TEMPERATURE ⇒ OFF)
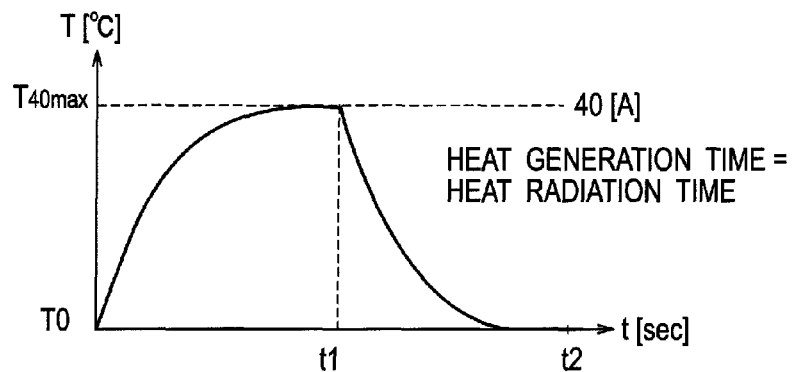
(b)
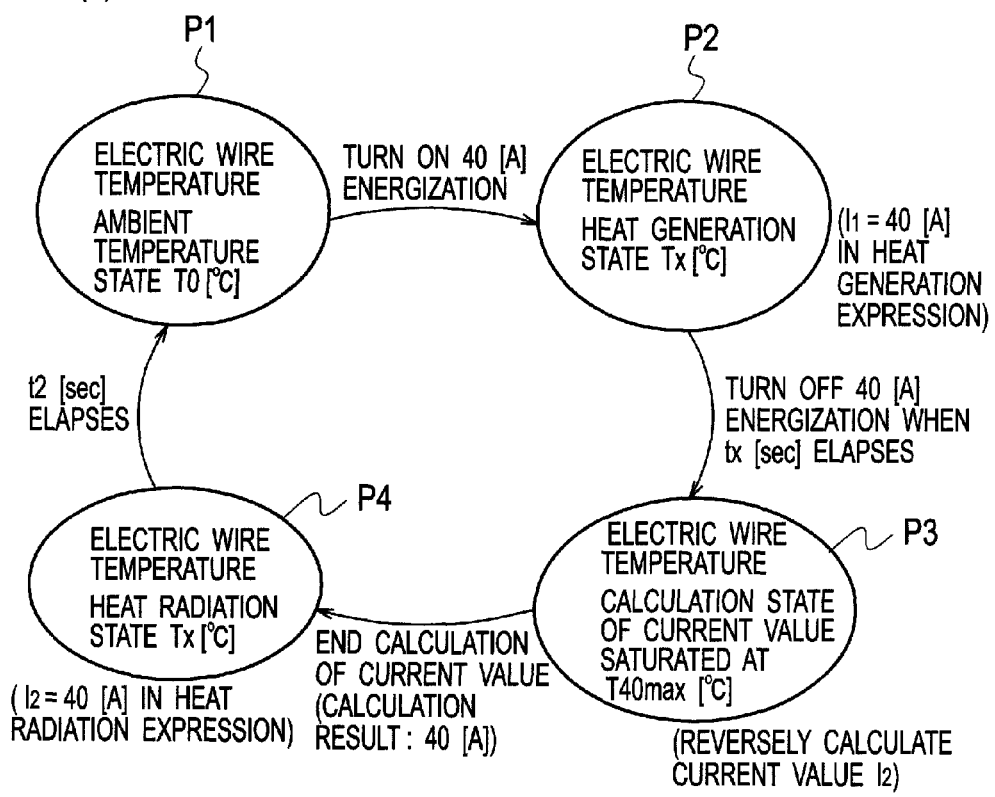

FIG. 13
(a)
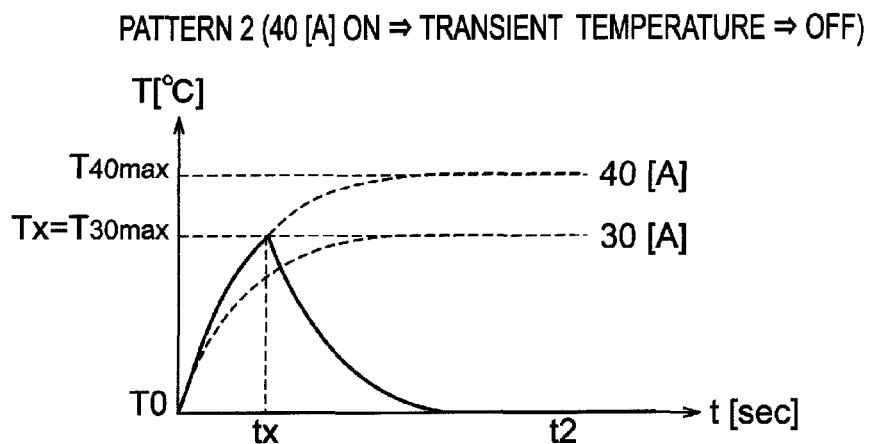
(b)
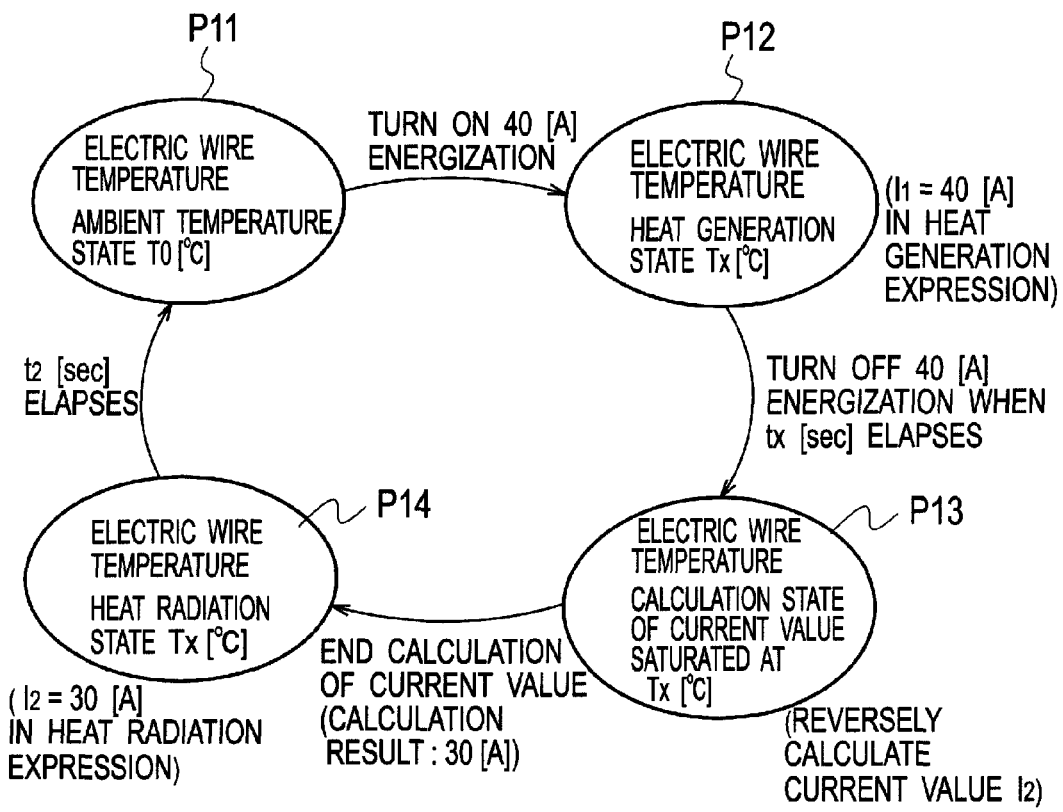

FIG. 14
(a)
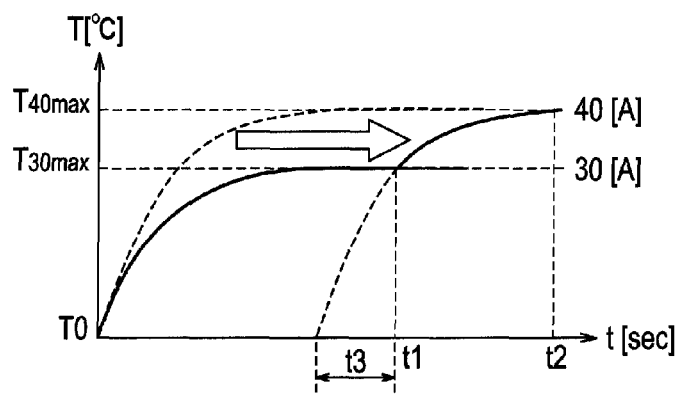
(b)
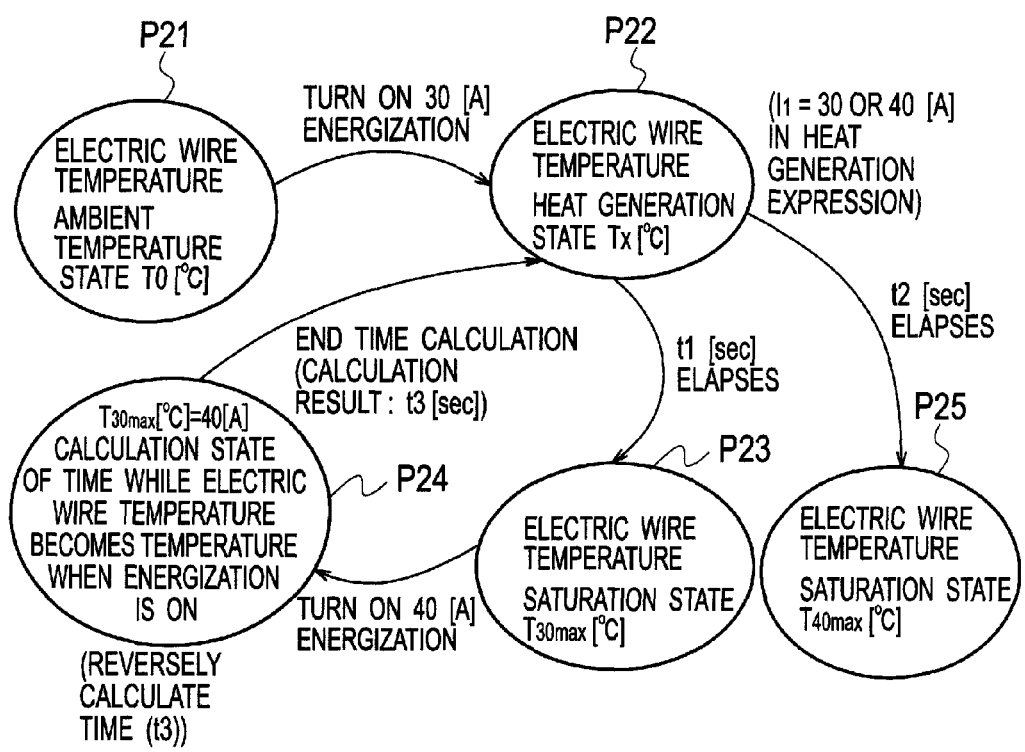

FIG. 15
(a)
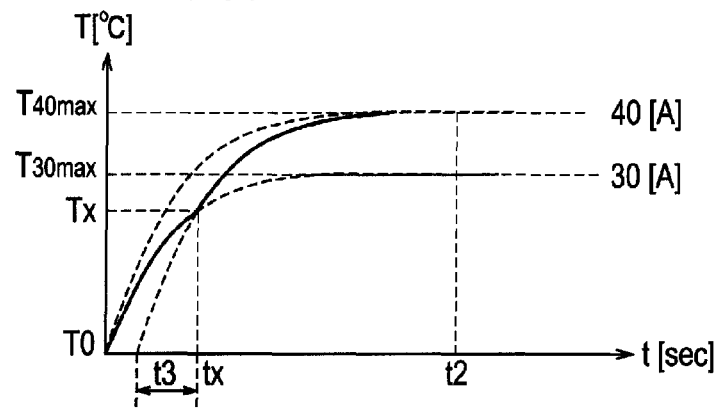
(b)
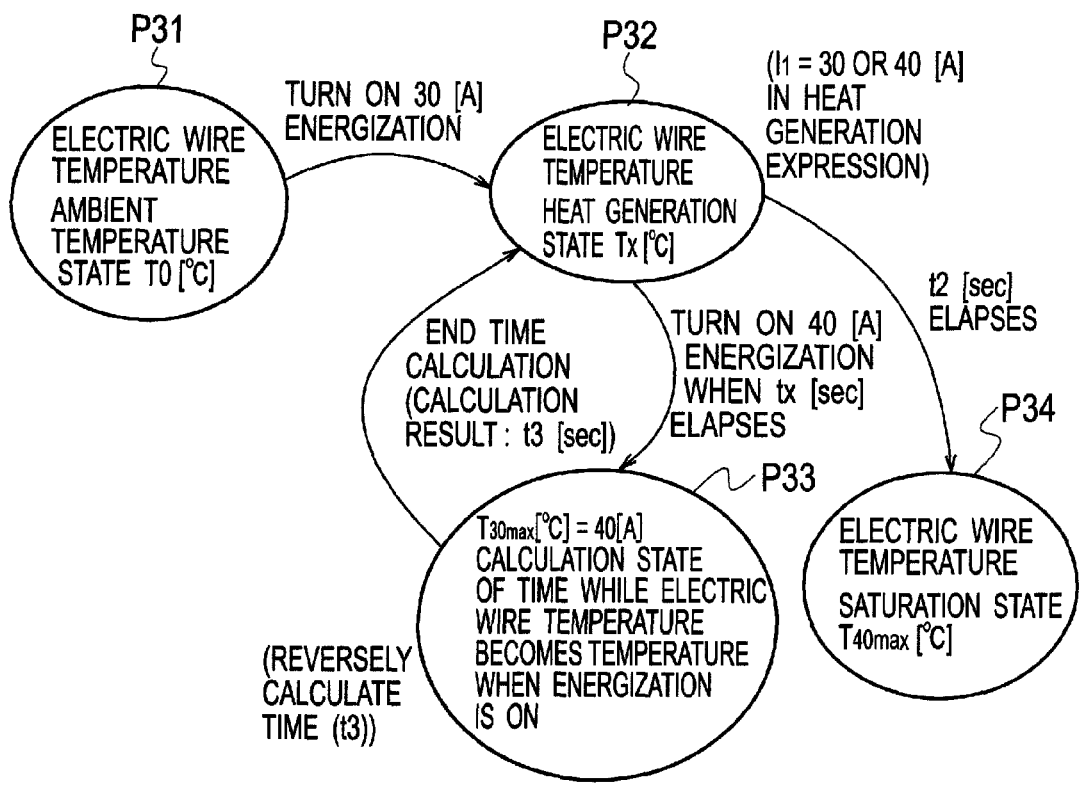

FIG. 16
(a)
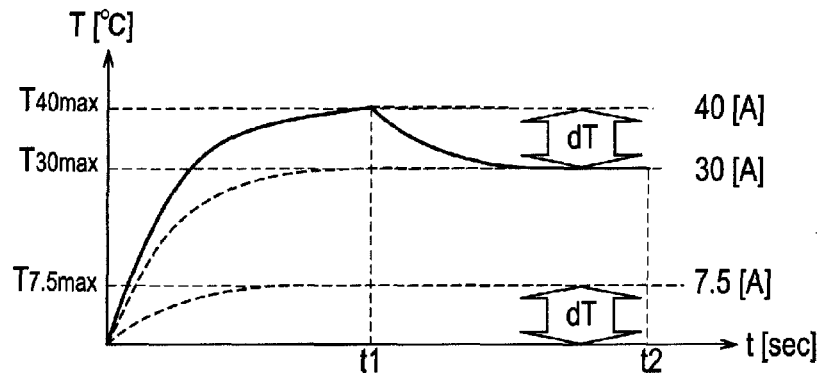
(b)
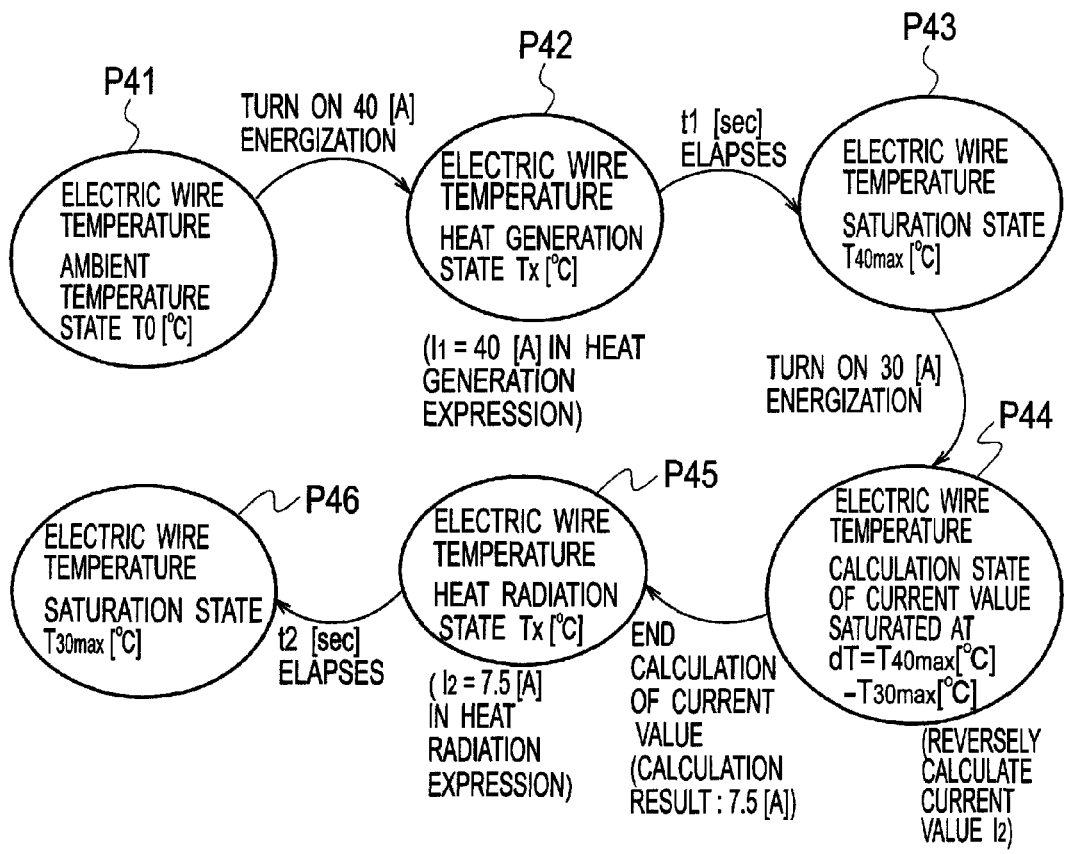

FIG. 17
(a)
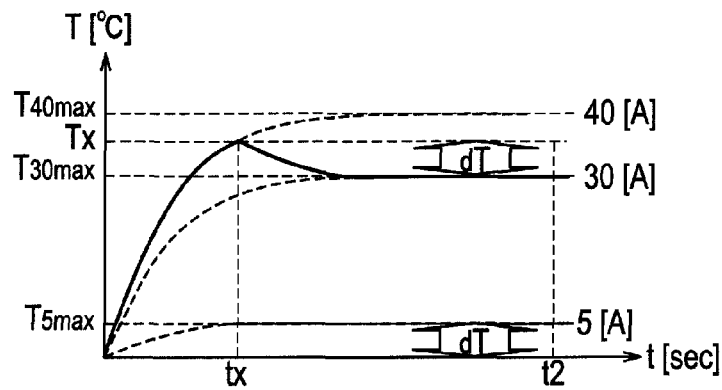
(b)
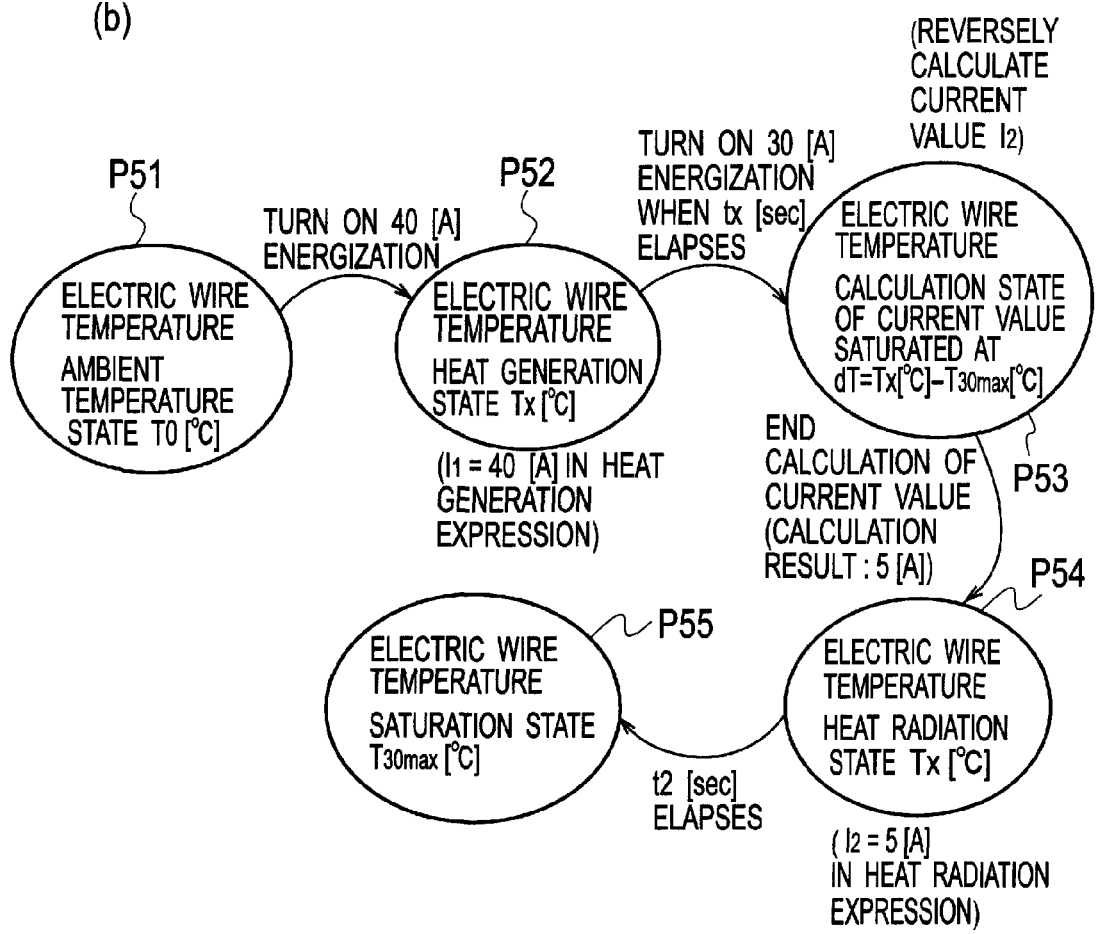

PROTECTION APPARATUS OF LOAD CIRCUIT

TECHNICAL FIELD

The present invention relates to a protection apparatus of a load circuit, which is for protecting the load circuit by breaking the load circuit instantaneously when an overcurrent flows through the load circuit as a result an electric wire temperature rises.

BACKGROUND ART

A load circuit that supplies electric power to a load such as a bulb and a motor, which is mounted on a vehicle, includes a battery and an electronic switch (MOSFET and the like) provided between the battery and the load. Then, the battery, the electronic switch and the load are connected to one another through conductors including electric wires. Moreover, a control circuit for performing ON/OFF operations for the electronic switch is provided, and drive and stop signals outputted from the control circuit perform the ON/OFF operations for the electronic switch, and switch the drive and stop of the load.

In the load circuit as described above, a fuse is provided for protecting the load, the electric wires, the electronic switch and the like by breaking the circuit instantaneously when an overcurrent flows through the load (refer to Patent Citation 1).

In a conventional load circuit shown in FIG. 1, power supply-side terminals of loads 101 are connected to a battery VB through an automotive electronic control unit (ECU) 102 and a junction box (J/B) 103.

Then, a plurality of electronic switches Tr1 such as the MOSFETs are provided in the ECU 102. These electronic switches Tr1 are controlled to be ON/OFF by a control IC 104. Moreover, first fuses F1 are provided on an upstream side of the respective electronic switches Tr1. These first fuses F1 protect electric wires W101 on a downstream side thereof. In other words, the electric wires W101 provided on the downstream side of the first fuses F1 have an electric wire diameter (cross-sectional area) sufficient for enduring a breaking current of the first fuses F1.

Moreover, second fuses F2 are provided in the J/B 103. These second fuses F2 protect an electric wire W102 on a downstream side thereof. In other words, the electric wire W102 provided on the downstream side of the second fuses F2 has a diameter (cross-sectional area) sufficient for enduring a breaking current of the second fuses F2.

Here, for example, in the case where the bulbs are used as the loads 101, the fuses F1 and F2 are deteriorated by rush currents generated when the bulbs are turned ON and by repetition of ON/OFF of the bulbs. Then, in some cases, erroneous breakdown occurs in the fuses F1 and F2 owing to a deterioration of the fuses F1 and F2, which is caused by use thereof with time. In order to prevent an occurrence of such a trouble, fuses prepared considering a margin for a load current are selected. Specifically, fuses in which the breakdown currents are increased somewhat more than usual are used. As a result, it is necessary to use electric wires adaptable to characteristics of the fuses prepared considering the margin, and it has become difficult to reduce the diameter of the electric wires for use in the load circuit.
Patent Citation 1: US 2003/0202304 A1

DISCLOSURE OF INVENTION

Nowadays, a request that the electric wires for use in the load circuit be miniaturized and thinned as much as possible is being enhanced. Meanwhile, as described above, in the conventional load circuit, the fuses for breaking the circuit in the case where the electric wire temperature has risen owing to the occurrence of the overcurrent are provided. Then, the fuses are prepared considering the margin in order to prevent the erroneous breakdown owing to the deterioration caused by the use thereof with time. Therefore, the conventional load circuit has a disadvantage that it is difficult to miniaturize and thin the electric wires.

The present invention has been made in order to solve the conventional problem as described above. It is an object of the present invention to provide a protection apparatus of a load circuit, which enables the thinning of the electric wires by using a switch circuit simulating the fuses.

In order to achieve the above-described object, a protection apparatus of a load circuit according to a first aspect of the present invention is a protection apparatus of a load circuit that supplies, to a load, electric power outputted from a power supply and drives the load, the protection apparatus being for breaking the load circuit when an electric wire temperature of the load circuit has risen, including: a timer that counts an elapsed time; a current detection device that detects a current flowing through an electric wire on a downstream side thereof; a switch device that switches connection and breaking of the electric power to the load circuit; a temperature estimation device in which a pseudo-heat capacity smaller in value than a heat capacity of the electric wire for use in the load circuit and a pseudo-thermal resistance larger in value than a thermal resistance of the electric wire are set, the temperature estimation device having a pseudo-arithmetic expression in which the pseudo-heat capacity and the pseudo-thermal resistance are assigned to the heat capacity and the thermal resistance in an arithmetic expression for calculating the electric wire temperature from the heat capacity and thermal resistance of the electric wire, and estimating the electric wire temperature by using the pseudo-arithmetic expression based on a value of the current detected by the current detection device and on the elapsed time counted by the timer; and a breaking control device for breaking the switch device in a case where the electric wire temperature estimated by the temperature estimation device has reached an allowed temperature of the electric wire.

In such a configuration, a pseudo-arithmetic expression is created, in which a thermal resistance and heat capacity of an arithmetic expression that estimates the electric wire temperature connected to the load circuit are substituted by a pseudo-thermal resistance $R^*$ and a pseudo-heat capacity $C^*$, respectively. Then, the current detection device detects the load current. Moreover, the timer counts the time while the current has flown through the electric wire. Then, based on results of these, the electric wire temperature is estimated by the above-described pseudo-arithmetic expression. As a result, in the case where the estimated temperature has exceeded the allowed temperature of the electric wire, the switch device is broken, and the load circuit is protected. In this case, the electric wire temperature estimated by the pseudo-arithmetic expression is lower than the actual electric wire temperature. Therefore, in the case where the electric wire temperature has risen, the load circuit is surely broken before the risen temperature reaches the allowed temperature of the electric wire. In such a way, the electric wire and the load are protected.

Moreover, it is preferable that the breaking control device turn the switch device to a connection-enabled state in a case where the temperature estimated by the temperature estimation device has dropped to an ambient temperature or lower after the switch device was broken.

In such a configuration, even after the electric wire temperature exceeded the threshold temperature and the switch device was broken, the estimation of the electric wire temperature is continued. Then, in the case where the electric wire temperature has dropped to the ambient temperature (for example, 25 degrees Celsius) or lower, the switch device is turned to the connection-enabled state. Hence, a phenomenon can be avoided, in which energization of the load circuit is resumed in a state where the electric wire temperature continues to be high. In such a way, the load circuit is surely protected.

Moreover, it is preferable that the values of the pseudo-thermal resistance and the pseudo-heat capacity are set so that current/breaking time characteristics which are based on the pseudo-arithmetic expression can be lower than current/breaking time characteristics of an electric wire of which diameter is thinner by one level than a diameter of the electric wire for use in the load circuit.

With such a configuration, an electric wire with a diameter thinner than that of a conventional case becomes usable, and the thinning and miniaturization of the electric wire can be achieved. Therefore, miniaturization and space saving can be achieved as a whole. Furthermore, in the case of applying the protection apparatus to a load circuit mounted on a vehicle, enhancement of fuel consumption can be achieved.

Moreover, it is preferable that the values of the pseudo-thermal resistance and the pseudo-heat capacity are set so that current/breaking time characteristics which are based on the pseudo-arithmetic expression can be located between minimum current/breaking time characteristics and maximum current/breaking time characteristics of a fuse to be used for protecting the electric wire for use in the load circuit.

With such a configuration, current/breaking time characteristics simulating characteristics of the fuse used usually for protecting the electric wire of the load circuit can be set, and accordingly, an effect equivalent to that of the conventional fuse can be obtained.

Furthermore, the arithmetic expression for calculating the electric wire temperature is represented as,

[Math.1]

$$T2 = T1 + I1^2 rR\{1 - \exp(-t/CR)\} \qquad (1)$$

[Math.2]

$$T2 = T1 + I2^2 rR\{\exp(-t/CR)\} \qquad (2)$$

It is preferable that the expression (1) is used at a time of heat generation, and that the expression (2) is used at a time of heat radiation. Here, T1 is an ambient temperature (degree Celsius), T2 is an estimated temperature of the electric wire (degree Celsius), I1 and I2 are energization currents (ampere), r is an electric wire conductor resistance (ohm), R is the thermal resistance (degree Celsius/watt), C is the heat capacity (joule/degree Celsius), and t is a time (second).

In such a configuration, the heat generation of the electric wire is calculated by using the expression (1), and the heat radiation of the electric wire is calculated by using the expression (2), whereby the estimated temperature of the electric wire is obtained. Accordingly, it becomes possible to estimate the temperature with high accuracy.

In the protection apparatus of the load circuit according to the first aspect of the present invention, the thermal resistance R and the heat capacity C in the arithmetic expression that estimates the electric wire temperature connected to the load circuit are substituted by the pseudo-thermal resistance R* and the pseudo-heat capacity C*, and the electric wire temperature is estimated. Then, in the case where the estimated electric wire temperature has reached the allowed temperature (for example, a smoking occurrence temperature) of the electric wire, the switch device is broken, and the circuit is protected. Hence, in the case where the electric wire temperature has risen by the heat generation owing to the overcurrent, the circuit is surely broken before the electric wire temperature reaches the actual allowed temperature of the electric wire, and the electric wire and the load are protected. Moreover, unlike the conventional fuse, no deterioration occurs owing to a rush current and repetition of ON and OFF of the load. Therefore, it is not necessary to ensure the margin for the breaking temperature, whereby the diameter of the electric wire can be reduced. Hence, miniaturization and weight reduction of the electric wire can be achieved. Moreover, in the case where the protection apparatus is used for the vehicle, an effect of enhancing the fuel consumption of the vehicle can also be exerted.

BRIEF DESCRIPTION OF THE DRAWINGS

FIG. 12(a) and FIG. 12(b) are explanatory diagrams showing a procedure of calculating an electric wire temperature changed by heat generation and calculating an electric wire temperature changed by heat radiation in the protection apparatus of the load circuit according to the embodiment of the present invention.

FIG. 13(a) and FIG. 13(b) are explanatory diagrams showing a procedure of calculating an electric wire temperature changed by heat generation and calculating an electric wire temperature changed by heat radiation in the protection apparatus of the load circuit according to the embodiment of the present invention.

FIG. 14(a) and FIG. 14(b) are explanatory diagrams showing a procedure of calculating an electric wire temperature changed by heat generation and calculating an electric wire temperature changed by heat radiation in the protection apparatus of the load circuit according to the embodiment of the present invention.

FIG. 15(a) and FIG. 15(b) are explanatory diagrams showing a procedure of calculating an electric wire temperature changed by heat generation and calculating an electric wire temperature changed by heat radiation in the protection apparatus of the load circuit according to the embodiment of the present invention.

FIG. 16(a) and FIG. 16(b) are explanatory diagrams showing a procedure of calculating an electric wire temperature changed by heat generation and calculating an electric wire temperature changed by heat radiation in the protection apparatus of the load circuit according to the embodiment of the present invention.

FIG. 17(a) and FIG. 17(b) are explanatory diagrams showing a procedure of calculating an electric wire temperature changed by heat generation and calculating an electric wire temperature changed by heat radiation in the protection apparatus of the load circuit according to the embodiment of the present invention.

BEST MODE FOR CARRYING OUT THE INVENTION

A description will be made below of an embodiment of the present invention based on the drawings.

Figure 1:
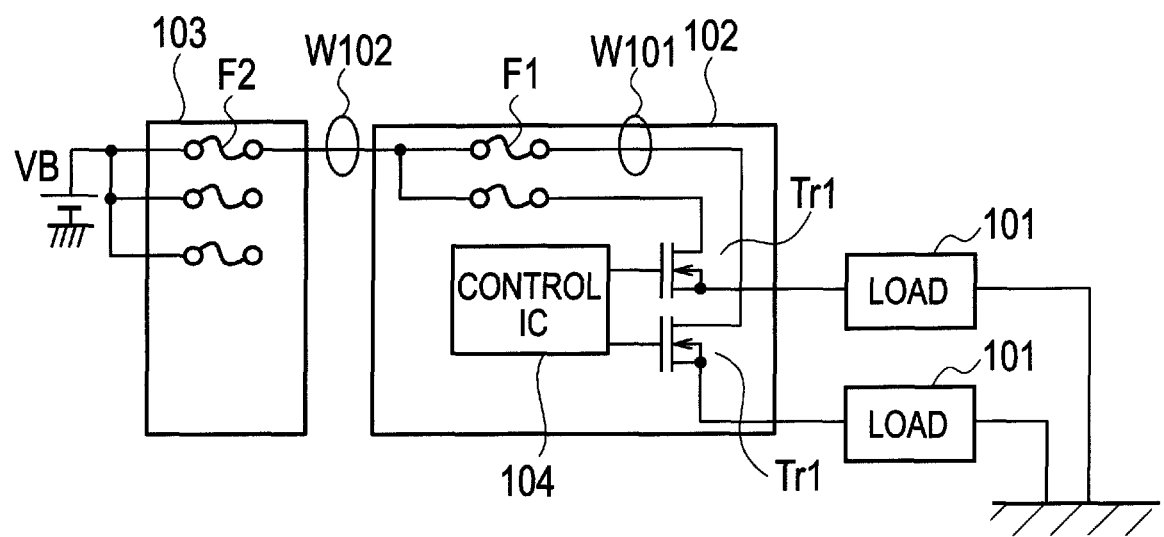
FIG. 1 is a circuit diagram showing a configuration of a protection apparatus of a load circuit in a conventional example.
Figure 2:
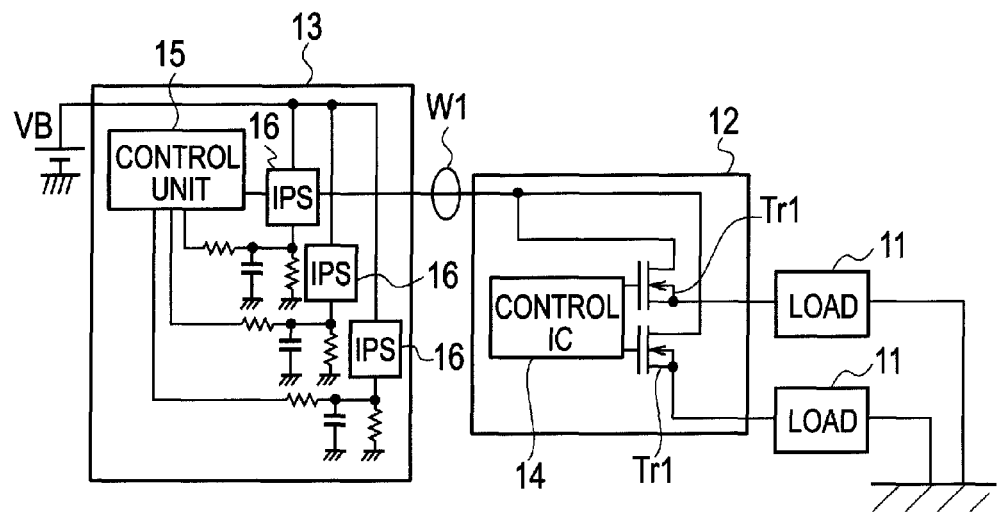
FIG. 2 is a circuit diagram showing a configuration of a protection apparatus of a load circuit according to an embodiment of the present invention.

A load circuit shown in FIG. 2 supplies electric power, which is outputted from a battery (power supply) VB, to loads 11, for example, such as bulbs and motors, which are mounted on a vehicle, and controls drive and stop of the respective loads 11. This load circuit includes an automotive electronic control unit (ECU) 12, and a junction box (J/B) 13.

The ECU 12 includes a plurality of electronic switches Tr1 such as MOSFETs. One-side terminals of the respective electronic switches Tr1 are connected to the loads 11, and other-side terminals thereof are connected to the J/B 13 through an electric wire W1. Moreover, the ECU 12 includes a control IC 14. Then, ON/OFF of the respective electronic switches Tr1 are controlled by the control IC 14, and the drive and stop of the loads 11 are controlled following the ON/OFF of the electronic switches Tr1.

The J/B 13 includes a plurality of switch circuits (IPS) 16 which connect the electric wire W1 and the battery VB to each other. The switch circuits 16 operate under a control of a control unit 15.

Figure 3:
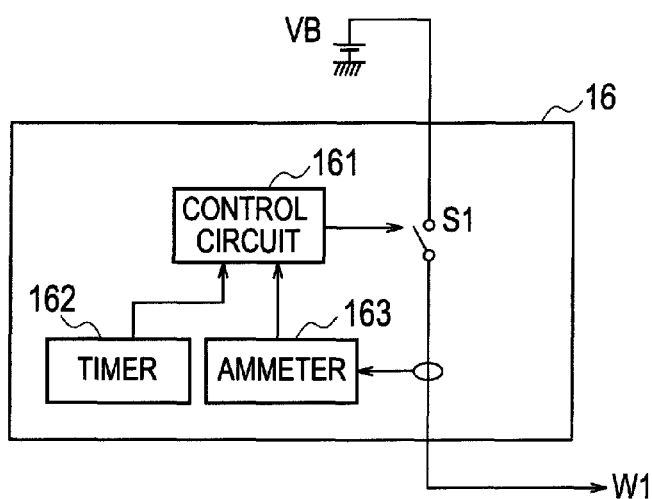
FIG. 3 is a block diagram showing a detailed configuration of a switch circuit in the protection apparatus of the load circuit according to the embodiment of the present invention.

As shown in FIG. 3, each of the switch circuits 16 includes: a semiconductor relay (switch device) S1; an ammeter 163 that detects a current flowing through the electric wire W1; a timer 162 that counts an elapsed time while the current is flowing through the electric wire W1; and a control circuit 161 that controls ON/OFF of the semiconductor relay S1 based on a value of the current detected by the ammeter 163 and on the time counted by the timer 162.

In a protection apparatus of the load circuit according to this embodiment, the control circuit (temperature estimation device, breaking control device) 161 estimates a temperature of the electric wire W1 by using a method to be described later (estimation method of an electric wire temperature, which uses a pseudo-arithmetic expression). Then, in the case where the estimated temperature of the electric wire W1 has reached an allowed temperature (for example, 150 degrees Celsius) of the electric wire W1, the control circuit 161 breaks an upstream side of the electric wire W1. As a result, the electric wire W1, and the respective switches Tr1 and the respective loads 11, which are provided on a downstream side of the electric wire W1, are protected.

A description will be made below in detail of the method of estimating the temperature of the electric wire W1. An expression (1) shown below is a general expression that represents an electric wire temperature at the time of heat generation. Moreover, an expression (2) is a general expression that represents an electric wire temperature at the time of heat radiation.

[Math.3]

$$T2 = T1 + I1^2 rR\{1 - \exp(-t/CR)\} \qquad (1)$$

[Math.4]

$$T2 = T1 + I2^2 rR\{\exp(-t/CR)\} \qquad (2)$$

Here, T1 is an ambient temperature (degree Celsius), T2 is the estimated temperature of the electric wire (degree Celsius), I1 and I2 are energization currents (ampere), r is an electric wire conductor resistance (ohm), R is a thermal resistance (degree Celsius/watt), C is a heat capacity (joule/degree Celsius), and t is a time (second). Note that, for the above-described ambient temperature T1, a method of assigning an atmospheric temperature that is based on an environment where the circuit is provided, a method of placing a thermometer (not shown) and assigning a temperature detected by the thermometer, or the like can be used.

Hence, the ambient temperature T1, the current I1 and the time t are assigned to the expression (1), whereby the estimated temperature T2 of the electric wire W1 at the time of heat generation is obtained. Moreover, the ambient temperature T1, the current I2 and the time t are assigned to the expression (2), whereby the estimated temperature T2 of the electric wire W1 at the time of heat radiation is obtained.

Then, if the switch circuit 16 is broken at the point of time when the estimated temperature T2 reaches a predetermined threshold temperature, then the whole of the load circuit including the electric wire W1 can be protected. For example, in the case where the allowed temperature of the electric wire W1 is 150 degrees Celsius, if the threshold temperature is preset at 50 degrees Celsius as a lower temperature than 150 degrees Celsius concerned, then the circuit is broken at the point of time before the electric wire W1 reaches the allowed temperature to cause smoking owing to heat generation by an overcurrent, whereby the whole of the load circuit including the electric wire W1 can be protected. Hence, if the protection apparatus of the load circuit according to this embodiment is used, then the temperature rise is surely sensed and the circuit is broken without providing any fuse on the upstream side of the respective load circuits as in the conventional case, whereby the circuit can be protected.

In this embodiment, the threshold temperature is set at the allowed temperature of the electric wire, and values of the thermal resistance R and the heat capacity C, which are shown in the above-described expressions (1) and (2), are changed, whereby a setting is made so that the circuit can be broken at a substantially lower temperature than the allowed temperature. Specifically, the above-described thermal resistance R is set at a value "R*" (pseudo-thermal resistance) larger than an actual thermal resistance of the electric wire, and the heat capacity C is set at a value "C*" (pseudo-heat capacity) smaller than an actual heat capacity of the electric wire.

Then, when the electric wire temperature T2 is calculated by using arithmetic expressions in which the pseudo-thermal resistance R* is assigned to the above-described expressions (1) and (2), a temperature higher than an actual temperature is calculated at the time of heat generation. A description will be made below of this matter with reference to characteristic charts shown in FIG. 4 and FIG. 5.

Figure 4:
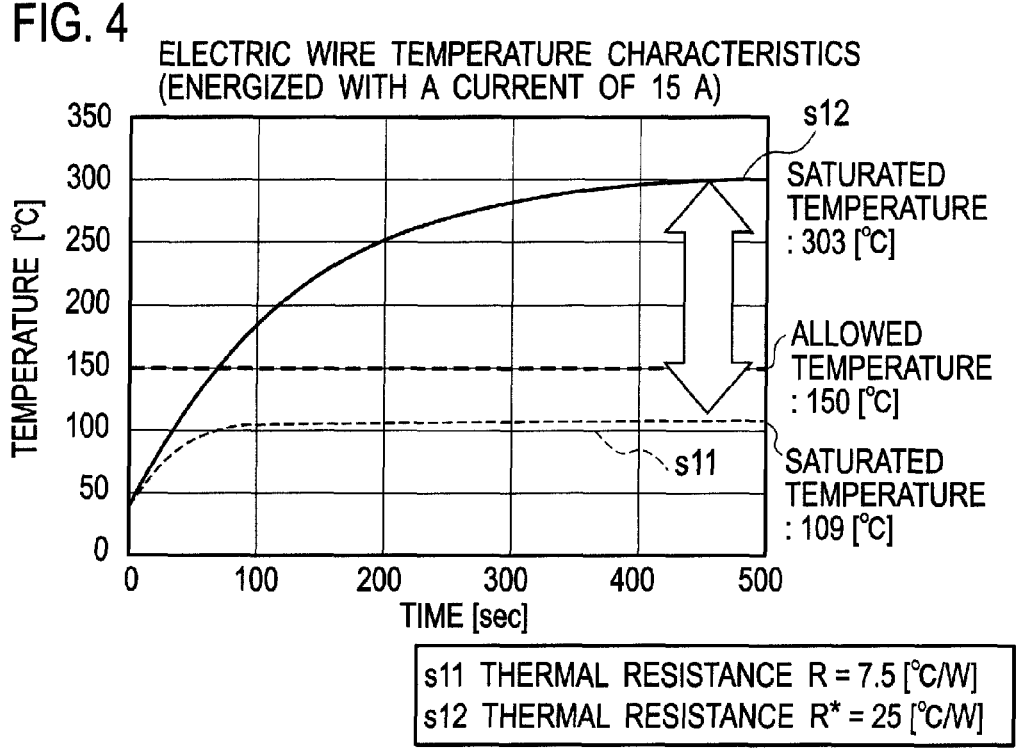
FIG. 4 is an explanatory chart showing current/breaking time characteristics when a thermal resistance is changed in the protection apparatus of the load circuit according to the embodiment of the present invention.

FIG. 4 is a characteristic chart showing changes of the electric wire temperature when an electric wire (hereinafter, referred to as a sample electric wire) with the allowed temperature of 150 degrees Celsius is used, and this sample electric wire is continuously energized with a current of 15 amperes. Here, a curve s11 is a characteristic curve in the case (case of using a usual thermal resistor) where the thermal resistance R shown in the expression (1) is set at a thermal resistance R of this sample electric wire, which is equal to 7.5 degrees Celsius/watt. Moreover, a curve s12 is a characteristic curve in the case where the thermal resistance R shown in the expression (1) is set at the pseudo-thermal resistance R* that is equal to 25 degrees Celsius/watt.

As shown by the curve s11, when the current of 15 amperes is flown through the sample electric wire, the electric wire temperature is saturated at 109 degrees Celsius. Specifically, even if the current of 15 amperes is flown through this electric wire for a long time, the electric wire temperature does not reach 150 degrees Celsius as the allowed temperature. As opposed to this, as shown by the curve s12, in the case of estimating the electric wire temperature by using the expression (1) (pseudo-arithmetic expression) using the pseudo-thermal resistance R* (hereinafter, this temperature is referred to as a "first reference electric wire temperature"), the electric wire temperature is saturated at 303 degrees Celsius, and exceeds 150 degrees Celsius as the allowed temperature at the point of time after elapse of approximately 70 seconds.

From the above-described matter, the pseudo-thermal resistance R* is used as the thermal resistance R for use in the expressions (1) and (2), whereby the first reference electric wire temperature is obtained as a temperature higher than the actual electric wire temperature. Specifically, if the pseudo-arithmetic expressions in which the pseudo-thermal resistance R* is assigned to the expressions (1) and (2) are used, then the first reference electric wire temperature reaches the allowed temperature even in the case where the actual electric wire temperature does not reach 150 degrees Celsius as the allowed temperature. Hence, if the load circuit is broken at the time when the first reference electric wire temperature has reached the allowed temperature, then the load circuit is broken at the point of time before the actual electric wire temperature reaches the allowed temperature, whereby the electric wire and constituent elements of the circuit can be protected.

Figure 5:
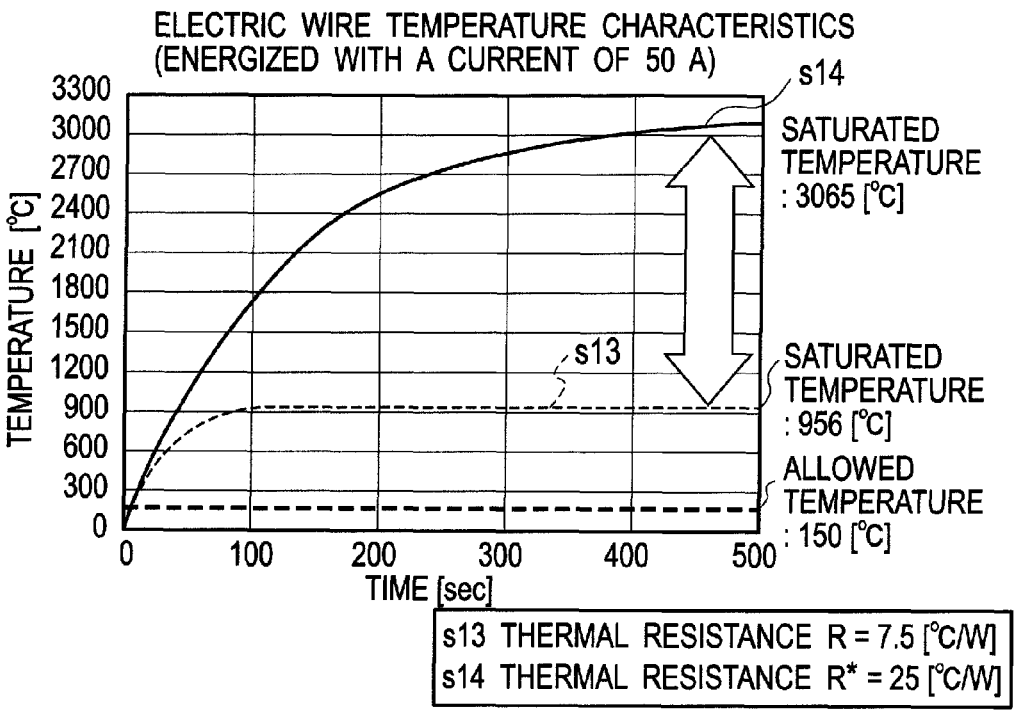
FIG. 5 is an explanatory chart showing current/breaking time characteristics when the thermal resistance is changed in the protection apparatus of the load circuit according to the embodiment of the present invention.

FIG. 5 is a characteristic chart showing changes of the electric wire temperature when the sample electric wire with the allowed temperature of 150 degrees Celsius is used, and this sample electric wire is continuously energized with a current of 50 amperes as a large current. Here, a curve s13 is a characteristic curve in the case where the thermal resistance R shown in the expression (1) is set at the thermal resistance R of this sample electric wire, which is equal to 7.5 degrees Celsius/watt. Moreover, a curve s14 is a characteristic curve in the case where the thermal resistance R shown in the expression (1) is set at the pseudo-thermal resistance R* that is equal to 25 degrees Celsius/watt.

As shown by the curve s13, when the current of 50 amperes is flown through the sample electric wire, the electric wire temperature is saturated at 956 degrees Celsius. Moreover, as shown by the curve s14, the first reference electric wire temperature obtained by using the pseudo-thermal resistance R* is saturated at 3065 degrees Celsius. Here, when the curves s13 and s14 are compared with each other, the curve s13 reaches the saturated temperature of 150 degrees Celsius at the point of time after elapse of approximately 5.5 seconds from the start of the energization, and the curve s14 reaches the saturated temperature of 150 degrees Celsius at the point of time after elapse of approximately 5.3 seconds from the start of the energization.

From the above-described matter, it is understand that, in the case where such a large current that exceeds the allowed temperature of the sample electric wire flows continuously, both of the actual electric wire temperature and the first reference electric wire temperature reach 150 degrees Celsius as the saturated temperature in substantially the same time.

Hence, from the characteristic charts shown in FIG. 4 and FIG. 5, the pseudo-thermal resistance R* is used, whereby the circuit can be broken instantaneously in the case where such a large current that exceeds the allowed temperature of the electric wire flows therethrough, and the circuit can be broken at an earlier point of time before the electric wire temperature reaches the allowed temperature in the case where the current approximate to the allowed temperature of the electric wire flows therethrough.

Next, when the electric wire temperature T2 is calculated by using arithmetic expressions (pseudo-arithmetic expressions) in which both of the pseudo-thermal resistance R* and the pseudo-heat capacity C* are assigned to the above-described expressions (1) and (2), a time until the electric wire temperature reaches the saturated temperature (saturation time) becomes shorter than an actual saturation time at the time of power generation. A description will be made below of this mater with reference to characteristic charts shown in FIG. 6 and FIG. 7.

Figure 6:
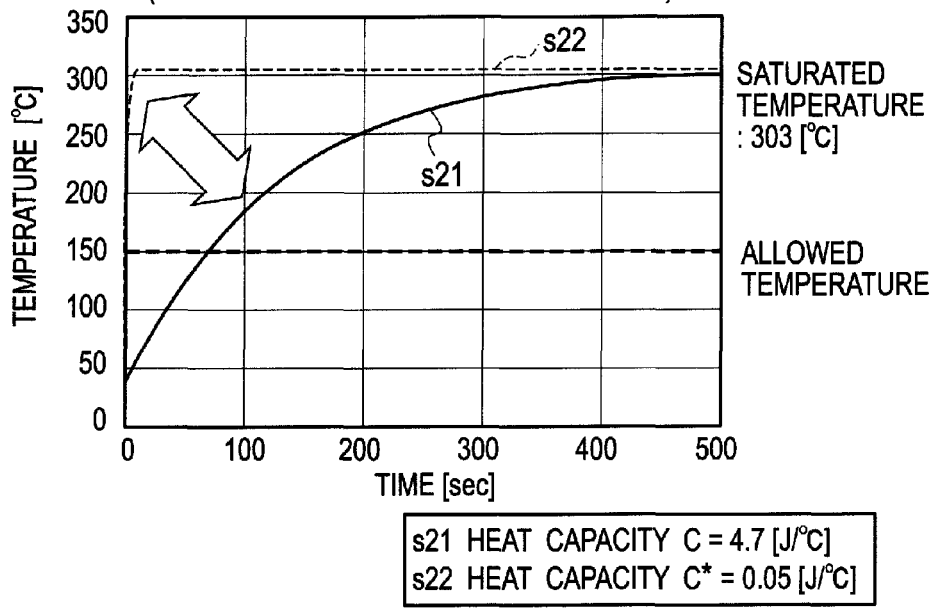
FIG. 6 is an explanatory chart showing current/breaking time characteristics when a heat capacity is changed in the protection apparatus of the load circuit according to the embodiment of the present invention.

FIG. 6 is a characteristic chart showing changes of the electric wire temperature when the electric wire with the allowed temperature of 150 degrees Celsius is used (hereinafter, referred to as a sample electric wire), and the current of 15 amperes is continuously flown through this sample electric wire. Here, a curve s21 is a characteristic curve in the case where the heat capacity C shown in the expression (1) is set at a heat capacity C of this sample electric wire, which is equal to 4.7 joules/degree Celsius. Moreover, a curve s22 is a characteristic curve in the case where the heat capacity C shown in the expression (1) is set at a pseudo-heat capacity C* that is equal to 0.05 joules/degree Celsius. Note that the above-described pseudo-thermal resistance R* is used as the thermal resistance.

As shown by the curve s21, when the current of 15 amperes is flown through the sample electric wire, the electric wire temperature is saturated at 303 degrees Celsius. This matter is the same as that of the curve s12 shown in FIG. 4. As opposed to this, as shown by the curve s22, in the case of calculating the electric wire temperature by using the pseudo-heat capacity C* (hereinafter, this temperature is referred to as a "second reference electric wire temperature"), a saturated temperature is 303 degrees Celsius in the same way as in the curve s21; however, the time until the electric wire temperature reaches the saturated temperature (saturation time) is shortened. Specifically, in the curve s21, the electric wire temperature reaches 303 degrees Celsius as the saturated temperature after elapse of approximately 400 seconds from the start of the energization, and in the curve s22, the electric wire temperature reaches 303 degrees Celsius as the saturated temperature substantially instantaneously after the start of the energization. As a result, while the electric wire temperature reaches 150 degrees Celsius as the allowed temperature at the point of time when approximately 70 seconds elapsed from the start of the energization in the curve s21, and the electric wire temperature reaches 150 degrees Celsius as the allowed temperature substantially instantaneously after the start of the energization in the curve s22.

From the above-described matter, the pseudo-thermal resistance R* and the pseudo-heat capacity C* are used as the thermal resistance R and the heat capacity C, which are for use in the expressions (1) and (2), whereby such a time required until the second reference electric wire temperature reaches the saturated temperature of the energization current is shortened.

Figure 7:
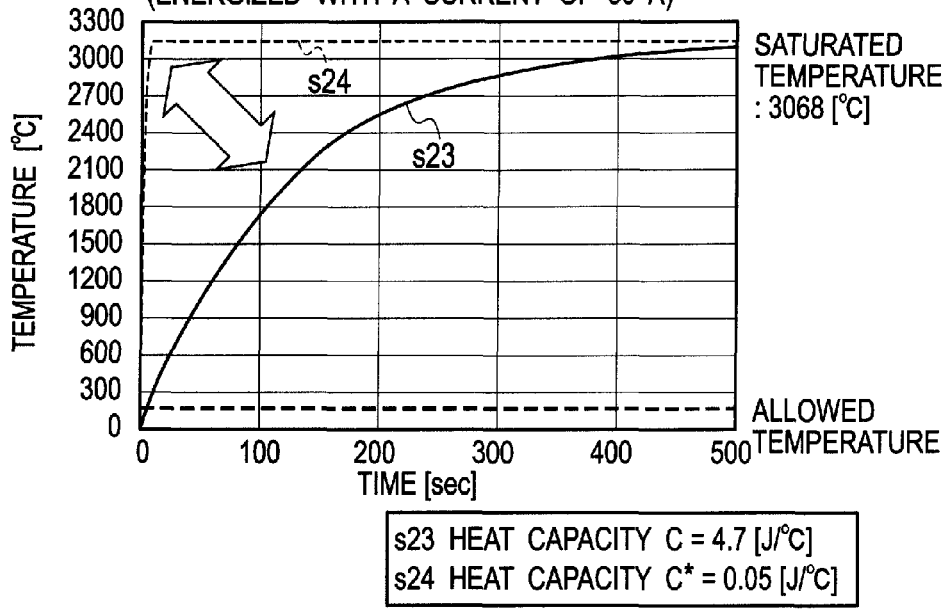
FIG. 7 is an explanatory chart showing current/breaking time characteristics when the heat capacity is changed in the protection apparatus of the load circuit according to the embodiment of the present invention.

FIG. 7 is a characteristic chart showing changes of the electric wire temperature when the current of 50 amperes is continuously flown through the sample electric wire with the allowed temperature of 150 degrees Celsius. Here, a curve s23 is a characteristic curve in the case where the heat capacity C shown in the expression (1) is set at the heat capacity C of the sample electric wire, which is equal to 4.7 joules/degree Celsius. Moreover, a curve s24 is a characteristic curve in the case where the heat capacity C shown in the expression (1) is set at the pseudo-heat capacity C* that is equal to 0.05 joules/degree Celsius. Note that the above-described pseudo-thermal resistance R* is used as the thermal resistance.

As shown by the curve s23, when the current of 50 amperes is flown through the sample electric wire, the electric wire temperature is saturated at 3068 degrees Celsius. As opposed to this, as shown by the curve s24, in the case of estimating the electric wire temperature (second reference electric wire temperature) by using the pseudo-heat capacity C*, a saturated temperature thereof is 3068 degrees Celsius, which is the same as that of the curve s23; however, the time until the electric wire temperature reaches the saturated temperature is shortened. Specifically, in the curve s23, the electric wire temperature reaches 3068 degrees Celsius as the saturated temperature after elapse of approximately 500 seconds from the start of the energization, and in the curve s24, the electric wire temperature reaches 3068 degrees Celsius as the saturated temperature substantially instantaneously after the start of the energization.

Moreover, a time until the electric wire temperature reaches 150 degrees Celsius as the allowed temperature is substantially the same between the curves s23 and s24. Hence, in the case where the large current is flown through the electric wire, the electric wire temperature reaches the allowed temperature substantially instantaneously regardless of the heat capacity.

From the above-described matter, in the expressions (1) and (2), the thermal resistance R is set at the pseudo-thermal resistance R* larger than the actual thermal resistance R, and the heat capacity C is set at the pseudo-heat capacity C* smaller than the actual heat capacity C. It is understood that, in such a way, the second reference electric wire temperature estimated by the expressions (1) and (2) (pseudo-arithmetic expressions) reaches the allowed temperature as a lower temperature than the actual electric wire temperature, and reaches the allowed temperature earlier than the actual electric wire temperature. In other words, the pseudo-arithmetic expressions in which the pseudo-thermal resistance R* and the pseudo-heat capacity C* are used for the expressions (1) and (2) are created, and the electric wire temperature is estimated by using the pseudo-arithmetic expressions. Then, if the load circuit is broken in the case where this temperature has reached the allowed temperature (for example, 150 degrees Celsius) of the electric wire, then the threshold temperature in the event of breaking the electric wire becomes a lower temperature than the allowed temperature of the electric wire.

Hence, in this embodiment, the arithmetic expressions in which both of the pseudo-thermal resistance R* and the pseudo-heat capacity C* are assigned to the expressions (1) and (2) (pseudo-arithmetic expressions) are created, and the electric wire temperature owing to the heat generation and the electric wire temperature owing to the heat radiation are obtained by using the pseudo-arithmetic expressions. Then, in the case where the electric wire temperature T2 reached the allowed temperature (for example, 150 degrees Celsius) of the electric wire as a result of arithmetic operations using the pseudo-arithmetic expressions, the control circuit 161 breaks the semiconductor relay S1 and protects the circuit. Specifically, in the case where the electric wire temperature T2 reached the allowed temperature as a result of the arithmetic operations using the pseudo-arithmetic expression, the actual electric wire temperature is a lower temperature than this temperature T2, and accordingly, the circuit can be surely broken at the point of time before the electric wire temperature reaches the allowed temperature (for example, 150 degrees Celsius).

With reference to FIG. 8 to FIG. 11, it will be described below in detail that it is possible to protect the circuit by estimating the electric wire temperature by using the pseudo-arithmetic expressions.

Figure 8:
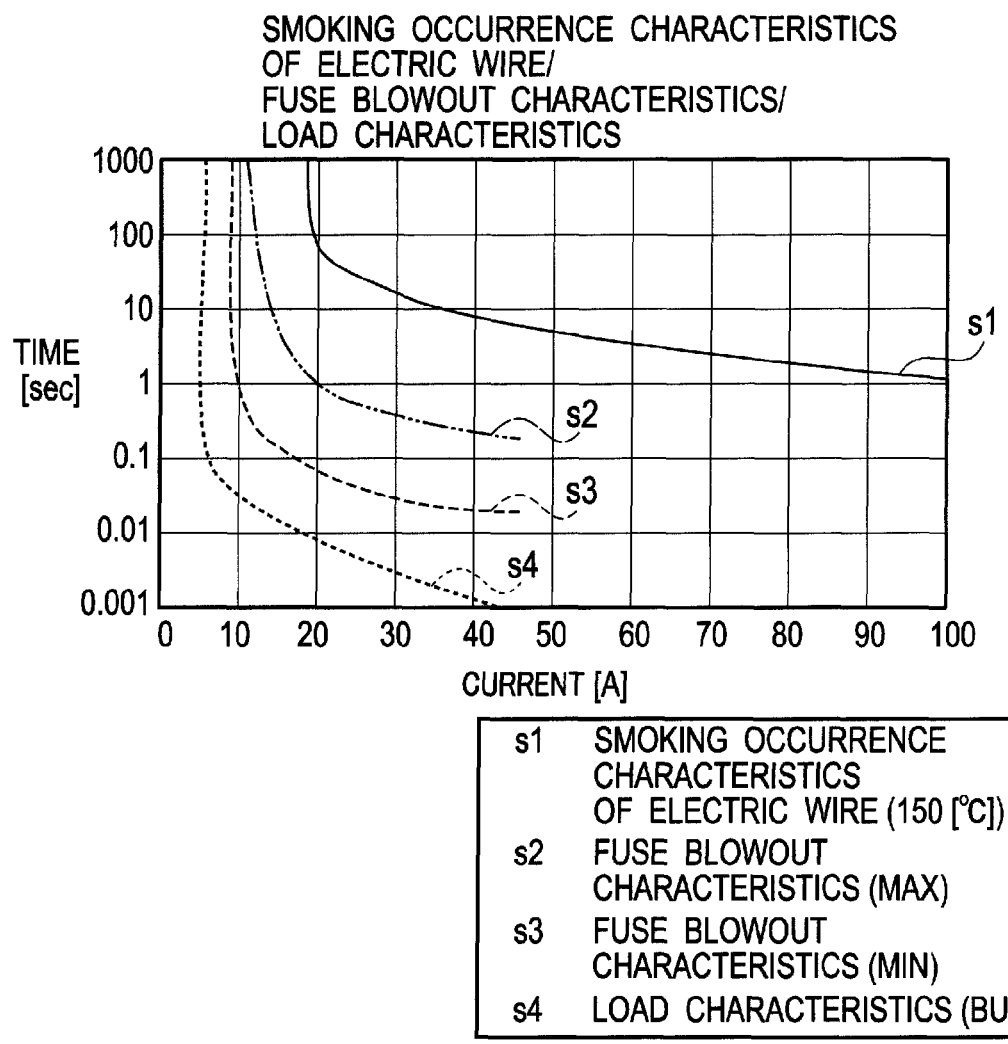
FIG. 8 is an explanatory chart showing current/breaking time characteristics in the protection apparatus of the load circuit according to the embodiment of the present invention.

A curve s1 shown in FIG. 8 is a chart showing current/breaking time characteristics when the allowed temperature is set at 150 degrees Celsius. Specifically, the curve s1 shows a relationship between the current I1 and the elapsed time t second on a right side of the above-described expression (1) when T2 on a left side thereof is fixed to 150 degrees Celsius. As understood from the curve s1, in the case where the allowed temperature (temperature at which smoking occurs by overheat) of the electric wire is 150 degrees Celsius, for example, the electric wire temperature does not reach 150 degrees Celsius in the case where a current of 20 amperes flows therethrough for 10 seconds, however the electric wire temperature reaches 150 degrees Celsius in the case where a current of 90 amperes flows therethrough for 10 seconds. Specifically, if the circuit operates at a current value on an inside of the curve s1 (lower-left side in the chart), then the electric wire temperature does not reach 150 degrees Celsius as the allowed temperature.

Moreover, curves s2 and s3 are current/breaking time characteristics of a fuse with a general standard, which is provided on the upstream side of the electric wire in which the allowed temperature is set at 150 degrees Celsius. The curve s2 shows a maximum value (MAX) of the above-described characteristics, and the curve s3 shows a minimum value (MIN) thereof. Specifically, when a current within a range between the curves s2 and s3 flows through this fuse, the fuse is broken, and protects the circuit. Hence, by using this fuse, the circuit can be surely broken at the point of time before the electric wire temperature reaches 150 degrees Celsius. Hence, if the switch circuit 16 shown in FIG. 2 and FIG. 3 is configured to include current/breaking time characteristics between the curves s2 and s3, then characteristics of the fuse used heretofore can be simulated.

Furthermore, a curve s4 shows load characteristics. The curve s4 operates on an inside (lower-left side) of the curves s2 and s3 showing the current/breaking time characteristics of the fuse, and accordingly, the fuse is not broken by a current flowing through the load at the time of a usual operation.

Figure 9:
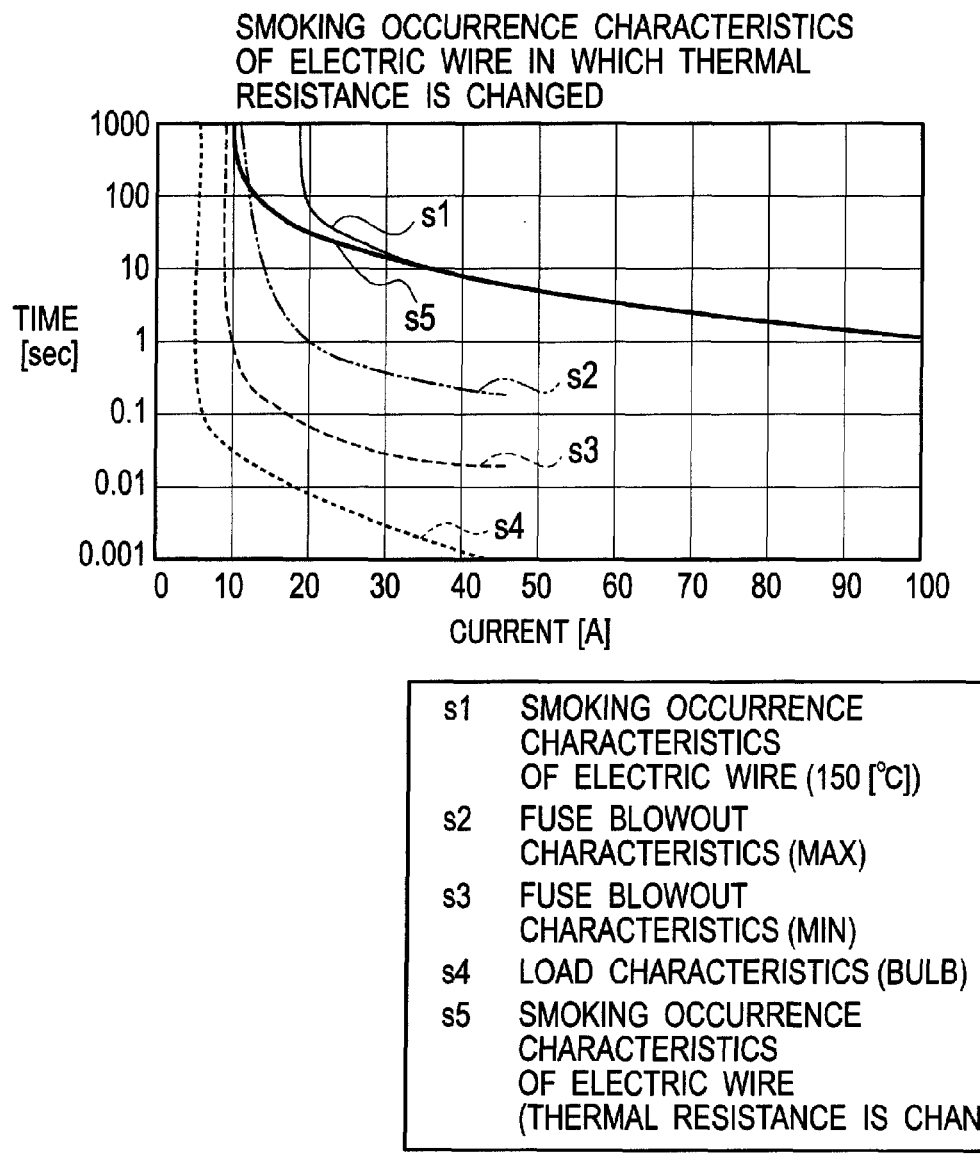
FIG. 9 is an explanatory chart showing current/breaking time characteristics in the protection apparatus of the load circuit according to the embodiment of the present invention.

FIG. 9 is a characteristic chart writing thereinto a characteristic curve s5 showing current/breaking time characteristics when the allowed temperature is set at 150 degrees Celsius in the case where the above-described thermal resistance R is changed to the pseudo-thermal resistance R*. Specifically, the curve s5 shows current/breaking time characteristics in the case where the pseudo-thermal resistance R* is set equal to 25 degrees Celsius/watt with respect to the actual thermal resistance R of the electric wire, which is equal to 7.5 degrees Celsius/watt. As illustrated, the curve s5 has current/breaking time characteristics located in a range between a maximum value and minimum value of the current/breaking time characteristics of the fuse in a low current range. Specifically, the curve s5 is a curve passing through the range between the curves s2 and s3 in the low current range, and includes characteristics simulating the fuse.

Figure 10:
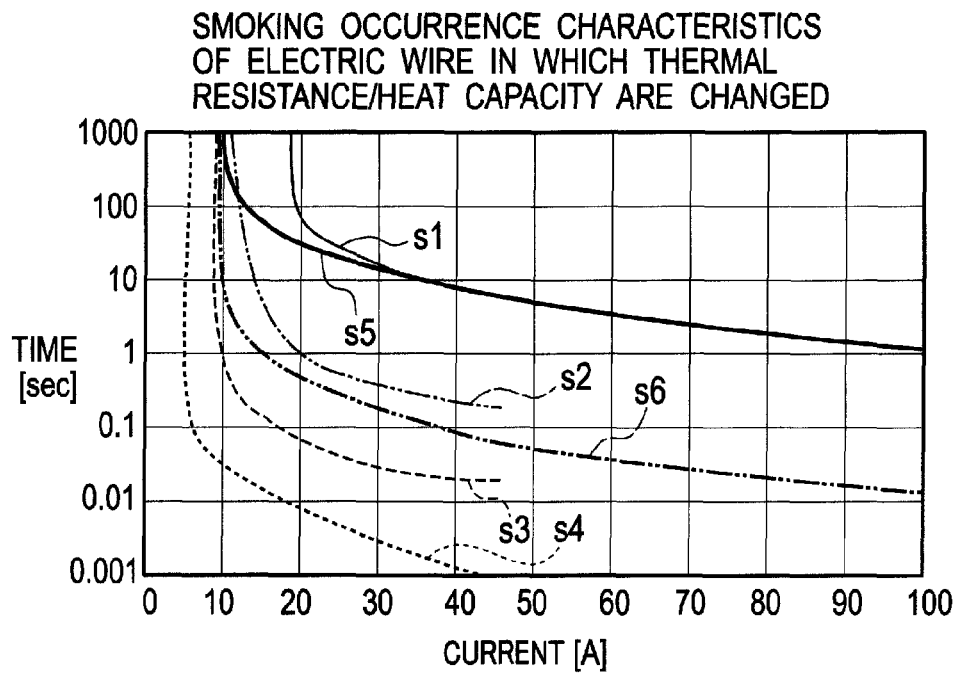
FIG. 10 is an explanatory chart showing current/breaking time characteristics in the protection apparatus of the load circuit according to the embodiment of the present invention.

FIG. 10 is a characteristic chart writing thereinto a characteristic curve s6 showing current/breaking time characteristics when the allowed temperature is set at 150 degrees Celsius in the case where the heat capacity C is changed to the pseudo-heat capacity C* in addition to the use of the above-described pseudo-thermal resistance R*. Specifically, the curve s6 shows current/breaking time characteristics in the case where the pseudo-heat capacity C* is set equal to 0.05 joules/degree Celsius with respect to the actual heat capacity C of the electric wire, which is equal to 4.7 joules/degree Celsius in addition to the use of the above-described pseudo-thermal resistance R*. As understood from the curve s6 of FIG. 10, in the case where both of the pseudo-thermal resistance R* and the pseudo-heat capacity C* are used, the current/breaking time characteristics are current/breaking time characteristics located in the range between the maximum value and minimum value of the current/breaking time characteristics of the fuse. Specifically, the curve s6 is a curve passing through the range between the curves s2 and s3 in the entire current range. By using these current/breaking time characteristics, the characteristics simulating the conventional fuse can be obtained.

Hence, in the protection apparatus of the load circuit according to this embodiment, the electric wire temperature is estimated by using the pseudo-arithmetic expressions in which the pseudo-thermal resistance R* and the pseudo-heat capacity C* are assigned to the thermal resistance R and the heat capacity C, respectively in the expressions (1) and (2). In such a way, the control circuit 161 breaks the circuit in accordance with the current/breaking time characteristics simulating the fuse.

Figure 11:
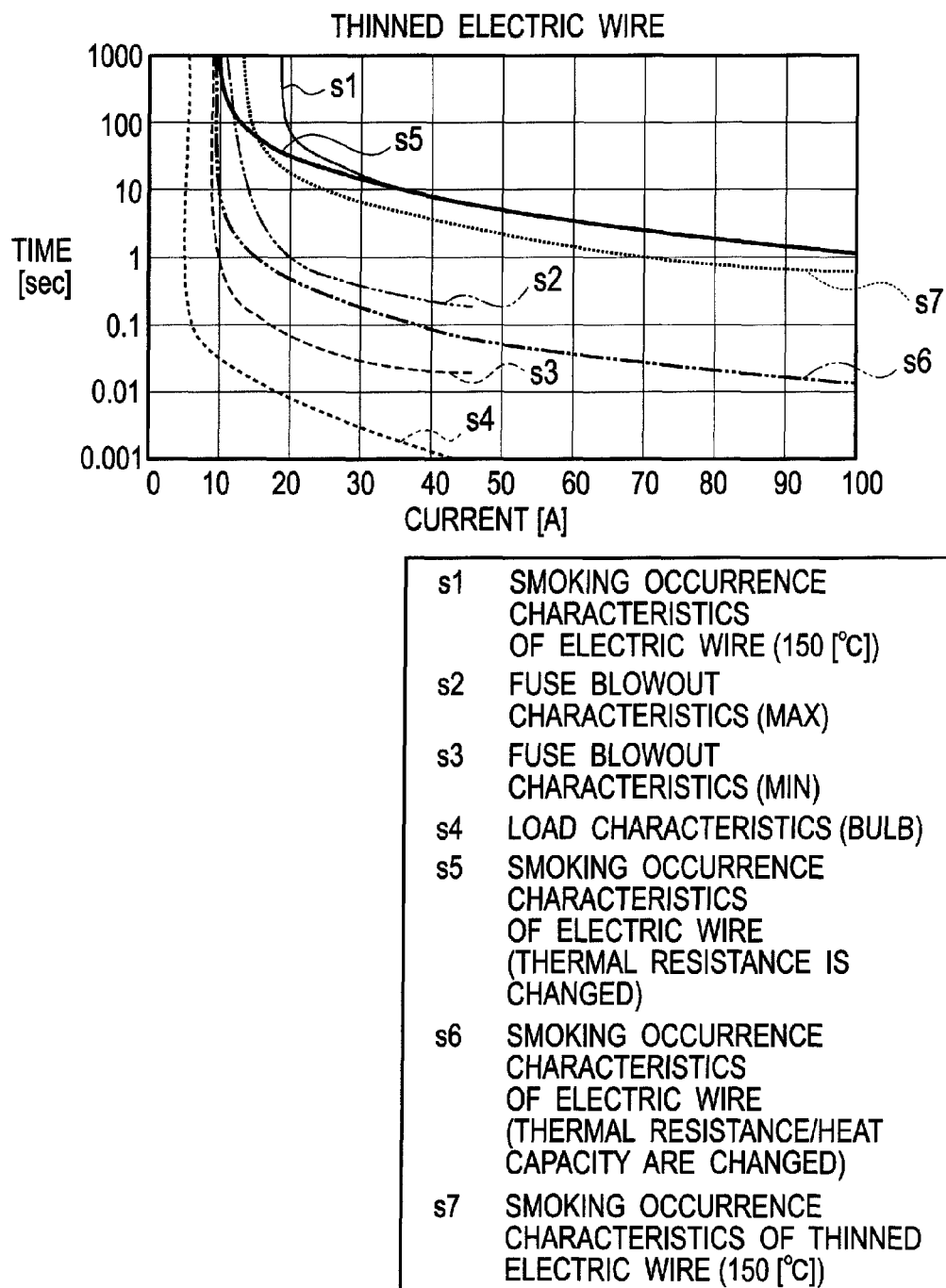
FIG. 11 is an explanatory chart showing current/breaking time characteristics in the protection apparatus of the load circuit according to the embodiment of the present invention.

FIG. 11 shows that a diameter of the electric wire can be reduced more than in the conventional case by the fact that the switch circuit 16 is capable of breaking the circuit in accordance with the current/breaking time characteristics shown by the above-described curve s6. Specifically, by using the switch circuit 16 including the current/breaking time characteristics as shown by the curve s6, for example, an electric wire with an allowed temperature shown by a curve S7, which is lower than the allowed temperature shown by the curve s1, can be used without any trouble even if the electric wire with the allowed temperature shown by the curve s1 is changed to the electric wire with such a lower allowed temperature shown by the curve S7. Specifically, in the protection apparatus of the load circuit according to this embodiment, the diameter of the electric wire can be reduced by using the switch circuit 16 including the current/breaking time characteristics equivalent to those of the conventional fuse.

Next, a description will be made of patterns 1 to 6 shown in FIG. 12 to FIG. 17, which are related to procedures of calculating the electric wire temperature at the time of heat generation by the above-described expression (1) and calculating the electric wire temperature at the time of heat radiation by the above-described expression (2).

(Pattern 1)

FIG. 12(a) is a characteristic chart showing a temperature change of the electric wire in the case where the electric wire temperature is saturated at a constant current (40 amperes), and the current is thereafter broken radiating heat. Moreover, FIG. 12(b) is an explanatory diagram showing a change of the state. First, the current of 40 amperes flows through the electric wire in a state where an initial temperature is T0 as the ambient temperature (state P1). Then, the electric wire temperature gradually rises from the temperature T0 (state P2), and reaches T40max as the saturated temperature at the current of 40 amperes at a time tx=t1. Specifically, T0 is assigned to the ambient temperature T1 on the right side of the above-described expression (1), 40 amperes is assigned to the current I1 on the right side concerned, and t1 is assigned to the time t on the right side. Then, the estimated temperature T2 of the electric wire owing to the heat generation rises along a curve shown by FIG. 12(a), and reaches the saturated temperature T40max at the time t1.

When the current is thereafter broken, the current value I2 saturated at the electric wire temperature T40max is reversely calculated since the electric wire temperature at this time is T40max (state P3). As a result, the current value I2 is obtained as 40 amperes. Then, the ambient temperature is assigned to T1 shown in the expression (2), and the obtained current value I2 and elapsed time t are further assigned to the corresponding items in the expression (2), whereby the estimated temperature T2 of the electric wire owing to the heat radiation is obtained (state P4).

Specifically, in the case where the current is broken after the current of 40 amperes flowed through the electric wire and the temperature of the electric wire has reached the saturated temperature T40max of this current 40 amperes, 40 amperes is assigned to the current I2 shown in the right side of the expression (2), whereby the electric wire temperature at the time of heat radiation is obtained.

(Pattern 2)

FIG. 13(a) is a characteristic chart showing a temperature change of the electric wire in the case where the electric wire temperature has risen at a constant current (40 amperes), and in a transient state before the electric wire temperature reaches the saturated temperature T40max, the current is broken radiating the heat. Moreover, FIG. 13(b) is an explanatory diagram showing a change of the state. First, the current of 40 amperes flows through the electric wire in a state where the initial temperature is T0 as the ambient temperature (state P11). Then, the electric wire temperature gradually rises from the temperature T0 (state P12). Then, in the case where the energization of the current 40 amperes is broken at a time tx, that is, in the case where the current is broken at a transient temperature before the electric wire temperature reaches the saturated temperature T40max by the energization of 40 amperes, a temperature Tx by the heat generation at this time is obtained, and the current value I2 at which this temperature Tx becomes the saturated temperature is reversely calculated (state P13). For example, in the case where the electric wire temperature Tx at the time tx is a saturated temperature T30max when a current 30 amperes flows, 30 amperes is assigned to the current I2 on the right side of the expression (2), and the ambient temperature is further assigned to T1 on the right side, and the elapsed time is further assigned to t on the right side, whereby the estimated temperature T2 of the electric wire owing to the heat radiation is obtained (state P14).

Specifically, in the case where the current of 40 amperes flows, and the current is broken before the electric wire temperature reaches the saturated temperature T40max at the current of 40 amperes, the current saturated at the temperature when the current is broken is obtained. Then, this current is assigned to the corresponding item on the right side of the expression (2), whereby the electric wire temperature in the case of radiating the heat is obtained.

(Pattern 3)

FIG. 14(a) is a characteristic chart showing a temperature change of the electric wire in the case where the electric wire temperature reaches the saturated temperature by a first current (for example, 30 amperes), and the electric wire temperature further reaches the saturated temperature by a second current (for example, 40 amperes) larger than the first current. Moreover, FIG. 14(b) is an explanatory view showing a change of the state. First, the current of 30 amperes flows through the electric wire in a state where the initial temperature is T0 as the ambient temperature (state P21). Then, the electric wire temperature Tx gradually rises from the temperature T0 (state P22), and reaches the saturated temperature T30max at the time t1 (state P23).

In the case where the current is changed to 40 amperes in this state, an elapsed time t3 in the case of assuming that the electric wire temperature has reached T30max as a result of that the current of 40 amperes flowed from the beginning is reversely calculated (state P24). Then, 40 amperes is assigned to the current I1 on the right side of the expression (1), and the above-described t3 is assigned to the time t, and the estimated temperature T2 until the time elapses to the time t2 is obtained (state P22 one more time). Then, at the time t2, the electric wire temperature reaches the saturated temperature T40max at the current of 40 amperes (state P25).

Specifically, first, the current of 30 amperes flows, and the electric wire temperature reaches the saturated temperature T30max at the current of 30 amperes. Thereafter, in the case where the current is changed to 40 amperes, the elapsed time in the case of assuming that the current of 40 amperes has flowed from the beginning, that is, the time t3 shown in FIG. 14(a) is calculated. Then, the time t3 is assigned to the corresponding item of the expression (1), and the electric wire temperature is obtained.

(Pattern 4)

FIG. 15(a) is a characteristic chart showing a temperature change of the electric wire in the case where the electric wire temperature has risen by the first current (for example, 30 amperes), the first current is changed to the second current (for example, 40 amperes) larger than the first current before the electric wire temperature reaches the saturated temperature T30max by the first current, and the electric wire temperature reaches the saturated temperature T40max at the second current. Moreover, FIG. 15(b) is an explanatory view showing a change of the state. First, when the initial temperature is T0 as the ambient temperature (state P31), and the current of 30 amperes flows through the electric wire, the electric wire temperature Tx gradually rises from the temperature T0 (state P32). Then, when the electric wire temperature reaches Tx at the time tx, the current is changed to 40 amperes. Then, the elapsed time t3 in the case of assuming that the current of 40 amperes has flown from the beginning and the electric wire temperature has reached Tx is reversely calculated (state P33). Then, 40 amperes is assigned to the current I1 on the right side of the expression (1), and the above-described t3 is assigned to the time t on the right side, and the estimated temperature T2 until the time elapses to the time t2 is obtained (state P32 one more time). Then, at the time t2, the electric wire temperature reaches the saturated temperature T40max at the current of 40 amperes (state P34).

Specifically, in the case where the current is changed to 40 amperes at the point of time when the electric wire temperature reached the temperature Tx before reaching the saturated temperature at the current of 30 amperes as a result of that the current of 30 amperes flowed, the elapsed time in the case of assuming that the current of 40 amperes has flown from the beginning, that is, the time t3 shown in FIG. 15(a) is calculated. Then, the time t3 is assigned to the corresponding item of the expression (1), and the electric wire temperature is obtained.

(Pattern 5)

FIG. 16(a) is a characteristic chart showing a temperature change of the electric wire in the case where the electric wire temperature reaches the saturated temperature T40max at the first current by the first current (for example, 40 amperes), and the electric wire temperature drops to the saturated temperature T30max at the second current smaller than the first current by the second current (for example, 30 amperes). Moreover, FIG. 16(b) is an explanatory view showing a change of the state. First, the current of 40 amperes flows through the electric wire when the initial temperature is T0 as the ambient temperature (state P41). Then, the electric wire temperature Tx gradually rises from the temperature T0 (state P42), and reaches the saturated temperature T40max at the time t1 (state P43).

In the case where the current is changed to 30 amperes in this state, a difference dT (dT=T40max−T30max) between the saturated temperature T40max at the current of 40 amperes and the saturated temperature T30max at the current of 30 amperes is obtained. Then, the saturated current value I2 is calculated from the temperature difference dT (state P44). As a result, for example, in the case where the current value I2 becomes equal to 7.5 amperes, 7.5 amperes is assigned to I2 on the right side of the expression (2), and the estimated temperature T2 of the electric wire owing to the heat radiation is obtained (state P45). Thereafter, after the elapse of the time t2, the electric wire temperature reaches the saturated temperature T30max of the time when the current of 30 amperes flows (state P46).

Specifically, first, the current of 40 amperes flows, and the electric wire temperature reaches the saturated temperature T40max at the current of 40 amperes. Thereafter, in the case where the current is changed to 30 amperes, the difference dT between the respective saturated temperatures is obtained, and the current value I2 saturated at this temperature difference dT is calculated. Then, this current value I2 is assigned to the corresponding item of the expression (2), whereby the electric wire temperature is obtained.

(Pattern 6)

FIG. 17(a) is a characteristic chart showing a temperature change of the electric wire in the case where the electric wire temperature has risen by the first current (for example, 40 amperes), the first current is changed to the second current (for example, 30 amperes) smaller than the first current when the electric wire temperature reaches the temperature Tx before reaching the saturated temperature T40max at the first current, and the electric wire temperature drops to reach the saturated temperature T30max at the second current. Moreover, FIG. 17(b) is an explanatory view showing a change of the state. First, the current of 40 amperes flows through the electric wire when the initial temperature is T0 as the ambient temperature (state P51). Then, the electric wire temperature Tx gradually rises from the temperature T0 (state P52). Then, when the current is changed to 30 amperes when the electric wire temperature has reached Tx at the time tx, a temperature difference dT (dT=Tx−T30max) between the temperature Tx and the saturated temperature T30max of the time when the current of 30 amperes flows is obtained, and the current value I2 saturated at this temperature difference dT is calculated (state P53). As a result, for example, in the case where the current value I2 becomes equal to 5 amperes, 5 amperes is assigned to I2 on the right side of the expression (2), and the estimated temperature T2 of the electric wire owing to the heat radiation is obtained (state P54). Thereafter, after the elapse of the time t2, the electric wire temperature reaches the saturated temperature T30max of the time when the electric wire is energized with the current of 30 amperes (state P55).

Specifically, in the case where the current is changed to 30 amperes at the point of time when the electric wire temperature reaches the temperature Tx before reaching the saturated temperature T40max at the current of 40 amperes as a result of that the current of 40 amperes has flowed, the difference dT between the temperature Tx and the saturated temperature T30max of the time when the electric wire is energized with the current of 30 amperes is calculated, and the current value I2 saturated at this temperature difference dT is calculated. Then, this current value I2 is assigned to the corresponding item of the expression (2), whereby the electric wire temperature is obtained.

Figure 18A:
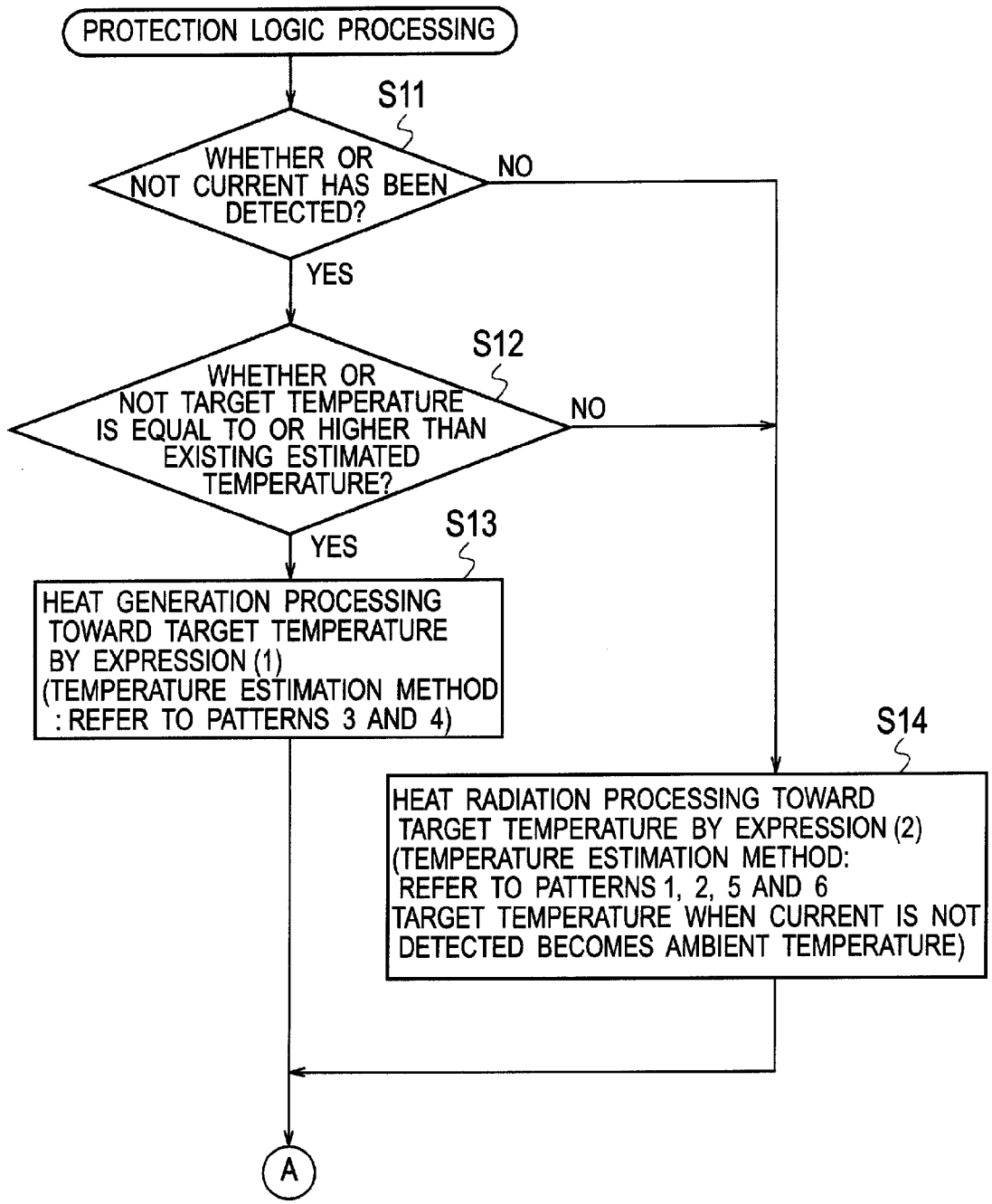
FIG. 18A is a flowchart showing processing operations of the protection apparatus of the load circuit according to the embodiment of the present invention.
Figure 18B:
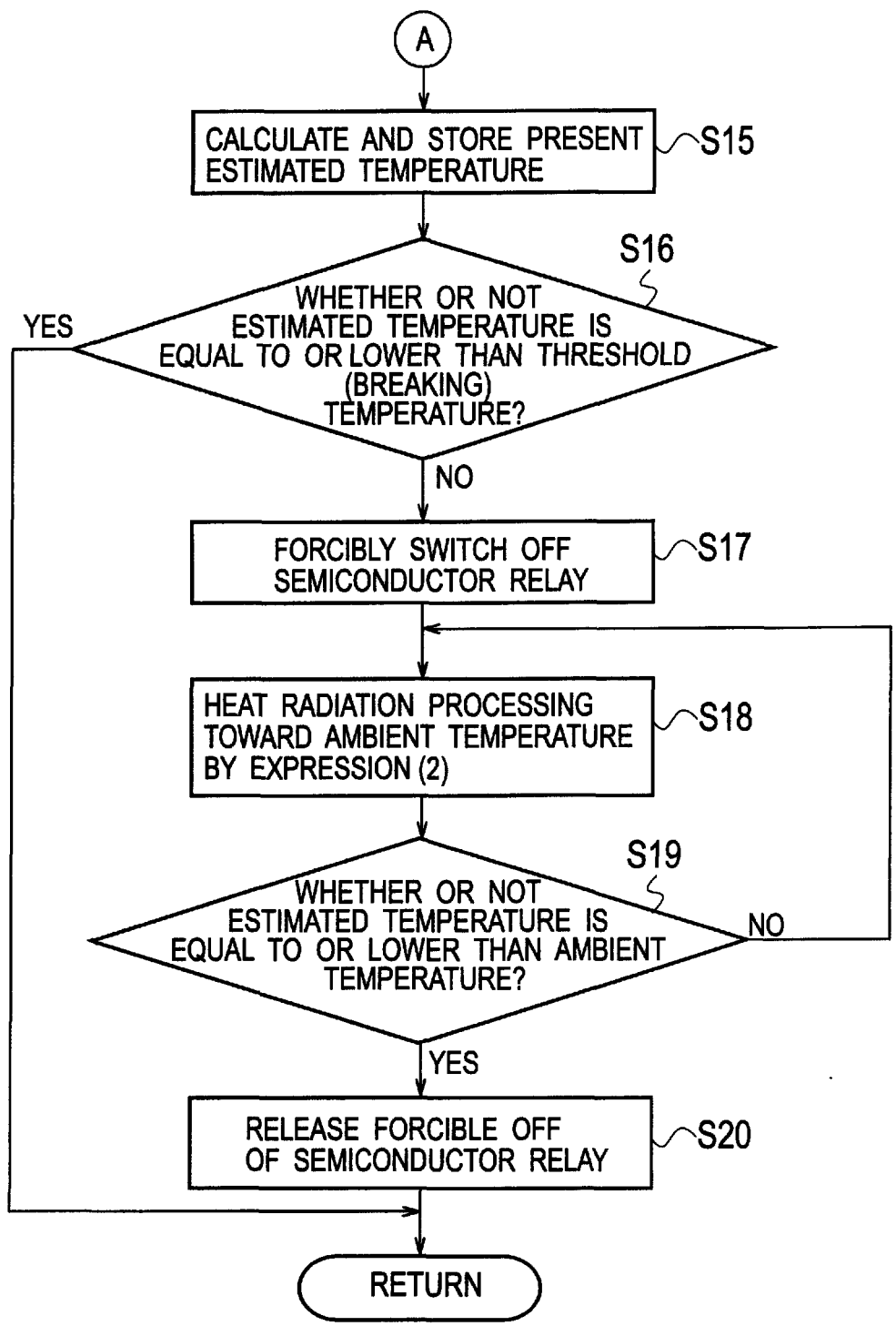
FIG. 18B is a flowchart of the continuance of FIG. 18A.

Next, a description will be made of processing operations of the protection apparatus of the load circuit according to this embodiment with reference to a flowchart shown in FIGS. 18A and 18B. Note that a series of processings shown in FIGS. 18A and 18B are executed repeatedly in a predetermined sampling cycle.

First, in processing of Step S11, the control circuit 161 of the switch circuit 16 shown in FIG. 3 determines whether or not the current is detected by the ammeter 163. Specifically, the control circuit 161 determines whether or not the current is flowing through the loads 11 shown in FIG. 2. Then, in the case of having determined that the current is flowing through the loads 11 (YES in Step S11), the processings proceed to Step S12. Meanwhile, in the case of having determined that the current is not flowing through the loads 11 (NO in Step S11), the processings proceed to Step S14.

In Step S12, the control circuit 161 determines whether or not a target temperature (saturated temperature in the case where the present current with a value continues to flow) of the present current value is equal to or higher than the existing estimated temperature (target temperature at the time of the previous sampling). Then, in the case of having determined that the target temperature is equal to or higher than the existing estimated temperature (YES in Step S12), the processings proceed to Step S13. Meanwhile, in the case of having determined that the target temperature is not equal to or higher than the existing estimated temperature (NO in Step S12), the processings proceed to Step S14.

In Step S13, the control circuit 161 executes heat generation processing toward the target temperature by the expression (1) (expression using the pseudo-thermal resistance R* and the pseudo-heat capacity C*). In this case, the temperature estimation methods shown in the above-mentioned patterns 3 and 4 are used. In the case where this processing is ended, the processings proceed to Step S15.

In Step S14, the control circuit 161 executes heat radiation processing toward the target temperature by the expression (2) (expression using the pseudo-thermal resistance R* and the pseudo-heat capacity C*). In this case, the temperature estimation methods shown in the above-mentioned patterns 1, 2, 5 and 6 are used. Moreover, the ambient temperature is defined as the target temperature in the case where the current is not detected. In the case where this processing is ended, the processings proceed to Step S15.

In Step S15, the control circuit 161 calculates the present estimated temperature of the electric wire W1 based on temperatures obtained by the processings of Steps S13 and S14. Moreover, the control circuit 161 stores the calculated estimated temperatures in a memory (not shown) and the like. In the case where this processing is ended, the processings proceed to Step S16.

In Step S16, the control circuit 161 determines whether or not the estimated temperature calculated in the processing of Step S15 is equal to or lower than a set protection temperature. The set protection temperature is a temperature obtained from the curve s6 of FIG. 10. Then, in the case where the estimated temperature is equal to or lower than the set protection temperature (YES in Step S16), the processings return to Step S11. Meanwhile, in the case where the estimated temperature is not equal to or lower than the set protection temperature (NO in Step S16), the processings proceed to Step S17.

In Step S17, the control circuit 161 forcibly switches OFF the semiconductor relay S1 shown in FIG. 3. Specifically, in the case where the estimated temperature of the electric wire is equal to or higher than the threshold value, the semiconductor relay S1 is broken, and the circuit is protected. In the case where this processing is ended, the processings proceed to Step S18.

In Step S18, the control circuit 161 executes heat radiation processing in which the ambient temperature is defined as the target temperature by using the expression (2). Specifically, even in the case where the semiconductor relay S1 is switched OFF, the electric wire W1 radiates the heat, and accordingly, a heat radiation temperature in this case is obtained. In the case where this processing is ended, the processings proceed to Step S19.

In Step S19, the control circuit 161 determines whether or not the estimated temperature has dropped to the ambient temperature or lower. Then, in the case where the estimated temperature has dropped to the ambient temperature or lower (YES in Step S19), the processings proceed to Step S20. Meanwhile, in the case where the estimated temperature has not dropped to the ambient temperature or lower (NO in Step S19), the processings return to Step S18.

In Step S20, the control circuit 161 releases such forcible OFF of the semiconductor relay S1. Specifically, in the case where the estimated temperature of the electric wire W1 has dropped to the ambient temperature or lower, no problem occurs even if the current is flown through the electric wire W1 one more time. Accordingly, the forcible OFF of the semiconductor relay S1 is released. In the case where this processing is ended, the processings return to Step S11.

As described above, in the protection apparatus of the load circuit according to this embodiment, the temperature of the electric wire W1 is estimated by using, as the expressions (1) and (2), the arithmetic expressions (pseudo-arithmetic expressions) using the pseudo-thermal resistance R* and the pseudo-heat capacity C*. Then, in the case where this estimated temperature has reached the allowed temperature (for example, 150 degrees Celsius) of the electric wire, the semiconductor relay S1 is broken. In such a way, the load circuit is protected. Hence, at the point of time before the actual temperature of the electric wire W1 reaches the allowed temperature (for example, 150 degrees Celsius) as a result of that the overcurrent flowed through the loads 11, the circuit can be surely broken, and the electric wire W1 and the load 11 provided on the downstream side thereof can be protected. Therefore, it is not necessary to use the conventional fuses.

Moreover, unlike the conventional fuses, no deterioration occurs owing to the rush currents and the repetition of the ON/OFF of the loads, and it is not necessary to ensure the margin for the breaking temperature. Therefore, the diameter of the electric wire can be reduced, and the miniaturization and weight reduction of the electric wire can be achieved. Furthermore, an effect of improving fuel consumption can be eventually exerted.

Moreover, for the conventional fuses, fixed current values such as 5 amperes, 7.5 amperes, 10 amperes, 15 amperes and 20 amperes have been set. However, in the protection apparatus of the load circuit according to this embodiment, the pseudo-thermal resistance R* and the pseudo-heat capacity C* are set appropriately. In such a way, arbitrary current values (for example, 6 amperes, 12.5 amperes and the like) can be set. Hence, the protection apparatus can be made to work on the reduction of the diameter of the electric wire.

Furthermore, in the protection apparatus of the load circuit according to this embodiment, the temperature estimation methods are used. Therefore, the protection apparatus can be applied not only to a load circuit having a configuration in which one fuse is provided with respect to one load, but also to a system in which a plurality of branched loads are connected to the downstream side, and to a load circuit in which the ON/OFF of the load is performed at random timing.

The description has been made above of the protection apparatus of the load circuit according to the present invention based on the illustrated embodiment. However, the present invention is not limited to this, and the configurations of the respective portions can be substituted by those with arbitrary configurations having similar functions. For example, though the description has been made of this embodiment, for example, by taking as an example the load circuit mounted on the vehicle, the present invention is not limited to this, and can also be applied to other load circuits.

INDUSTRIAL APPLICABILITY

The protection apparatus of the load circuit is extremely useful for protecting the electric wire without using the fuse for use in the load circuit.

The invention claimed is:

1. A protection apparatus of a load circuit that supplies, to a load, electric power outputted from a power supply and drives the load, the protection apparatus being for breaking the load circuit when an electric wire temperature of the load circuit has risen, comprising:
   a timer that counts an elapsed time;
   a current detection device that detects a current flowing through an electric wire on a downstream side thereof;
   a switch device that switches connection and breaking of the electric power to the load circuit;
   a temperature estimation device in which a pseudo-heat capacity smaller in value than a heat capacity of the electric wire for use in the load circuit and a pseudo-thermal resistance larger in value than a thermal resistance of the electric wire are set, the temperature estimation device having a pseudo-arithmetic expression in which the pseudo-heat capacity and the pseudo-thermal resistance are assigned to the heat capacity and the thermal resistance in an arithmetic expression for calculating the electric wire temperature from the heat capacity and thermal resistance of the electric wire, and estimating the electric wire temperature by using the pseudo-arithmetic expression based on a value of the current detected by the current detection device and on the elapsed time counted by the timer; and
   a breaking control device for breaking the switch device in a case where the electric wire temperature estimated by the temperature estimation device has reached an allowed temperature of the electric wire.

2. The protection apparatus of a load circuit according to claim 1, wherein the breaking control device turns the switch device to a connection-enabled state in a case where the temperature estimated by the temperature estimation device has dropped to an ambient temperature or lower after the switch device was broken.

3. The protection apparatus of a load circuit according to claim 1, wherein the values of the pseudo-thermal resistance and the pseudo-heat capacity are set so that current/breaking time characteristics which are based on the pseudo-arithmetic expression can be lower than current/breaking time characteristics of an electric wire of which diameter is thinner by one level than a diameter of the electric wire for use in the load circuit.

4. The protection apparatus of a load circuit according to claim 1, wherein the values of the pseudo-thermal resistance and the pseudo-heat capacity are set so that current/breaking time characteristics which are based on the pseudo-arithmetic expression can be located between minimum current/breaking time characteristics and maximum current/breaking time characteristics of a fuse to be used for protecting the electric wire for use in the load circuit.

5. The protection apparatus of a load circuit according to claim 1, wherein the arithmetic expression for calculating the electric wire temperature is represented as,

[Math. 1]

$$T2 = T1 + I1^2 rR\{1 - \exp(-t/CR)\} \quad (1)$$

[Math. 2]

$$T2 = T1 + I2^2 rR\{\exp(-t/CR)\} \quad (2)$$

in which the expression (1) is used at a time of heat generation, and the expression (2) is used at a time of heat radiation, where T1 is an ambient temperature (degree Celsius), T2 is an estimated temperature of the electric wire (degree Celsius), I1 and I2 are energization currents (ampere), r is an electric wire conductor resistance (ohm), R is the thermal resistance (degree Celsius/watt), C is the heat capacity [joule/degree Celsius], and t is a time (second).

6. The protection apparatus of a load circuit according to claim 1, wherein the pseudo-thermal resistance is set to 25 degrees Celsius/watt.

7. The protection apparatus of a load circuit according to claim 1, wherein the pseudo-heat capacity is set to 0.05 joules/degree Celsius.

* * * * *